(12) United States Patent
Tatsuno

(10) Patent No.: US 8,950,874 B2
(45) Date of Patent: Feb. 10, 2015

(54) PROJECTION OPTICAL SYSTEM AND IMAGE DISPLAY APPARATUS

(75) Inventor: Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 13/611,578

(22) Filed: Sep. 12, 2012

(65) Prior Publication Data

US 2013/0070217 A1    Mar. 21, 2013

(30) Foreign Application Priority Data

Sep. 16, 2011 (JP) ................. 2011-202691
Oct. 11, 2011 (JP) ................. 2011-223983

(51) Int. Cl.
G03B 21/28 (2006.01)
G03B 21/20 (2006.01)
G02B 17/08 (2006.01)

(52) U.S. Cl.
CPC ............ *G03B 21/2066* (2013.01); *G02B 17/08* (2013.01); *G03B 21/28* (2013.01)
USPC ............... 353/99; 353/30; 353/34; 353/37; 353/38; 353/101

(58) Field of Classification Search
CPC . H04N 5/7416; H04N 5/7458; H04N 9/3141; H04N 9/3197; H04N 9/3105; H04N 9/3167; G02B 19/0028; G02B 21/00; G02B 21/28
USPC ...................... 353/30, 34, 37, 38, 94, 99, 101; 348/743–747, 798, E5.139, E5.142, 348/E5.143; 359/736, 455, 627, 457, 460, 359/471, 479, 634, 640; 349/5, 7–9
See application file for complete search history.

(56) References Cited

U.S. PATENT DOCUMENTS 5,379,080 A * 1/1995 Onozuka ............. 353/37
5,662,400 A * 9/1997 Shikama et al. ........ 353/31

(Continued)

FOREIGN PATENT DOCUMENTS

JP     3727543       12/2005
JP     2007-79524 A   3/2007

(Continued)

OTHER PUBLICATIONS

Office Action issued Jul. 17, 2014 in Japanese Patent Application No. 2011-202691.

(Continued)

*Primary Examiner* — Sultan Chowdhury
(74) *Attorney, Agent, or Firm* — Oblon, Spivak, McClelland, Maier & Neustadt, L.L.P.

(57) ABSTRACT

A projection optical system for use in an image display apparatus having an illumination optical system applying light from a light source, and an image display device receiving the light from the illumination optical system to form a projection image includes a projector lens composed of plural lenses, a first mirror, and a second mirror formed of a concave mirror. The projection optical system is configured to project the projection image onto a projection surface. A projection luminous flux passing through the projector lens to be incident on the first mirror is a luminous flux exhibiting divergence. The projection luminous flux reflected off the second mirror after having reflected off the first mirror is converged once, and the once converged projection luminous flux is projected onto the projection surface. A lens surface of a lens located closest to the first mirror among the lenses of the projector lens is convex.

19 Claims, 24 Drawing Sheets

(56) References Cited

U.S. PATENT DOCUMENTS

| | | | |
|---|---|---|---|
| 6,120,152 A * | 9/2000 | Nakayama et al. | 353/31 |
| 6,257,726 B1 * | 7/2001 | Okuyama | 353/20 |
| 6,286,961 B1 * | 9/2001 | Ogawa | 353/38 |
| 6,343,862 B1 * | 2/2002 | Sawai et al. | 353/1 |
| 6,631,994 B2 | 10/2003 | Suzuki et al. | |
| 7,048,388 B2 | 5/2006 | Takaura et al. | |
| 7,922,340 B2 | 4/2011 | Ohzawa | |
| 8,052,283 B2 | 11/2011 | Imaoka et al. | |
| 8,087,789 B2 | 1/2012 | Amano et al. | |
| 8,128,238 B2 * | 3/2012 | Fujita et al. | 353/98 |
| 8,337,025 B2 * | 12/2012 | Kobayashi et al. | 353/79 |
| 2007/0184368 A1 | 8/2007 | Nishikawa et al. | |
| 2008/0068563 A1 | 3/2008 | Abe et al. | |
| 2009/0021703 A1 * | 1/2009 | Takaura et al. | 353/99 |
| 2009/0091928 A1 | 4/2009 | Tatsuno | |
| 2009/0257117 A1 | 10/2009 | Baba | |
| 2011/0267589 A1 * | 11/2011 | Amano et al. | 353/98 |
| 2012/0154768 A1 | 6/2012 | Tatsuno | |
| 2012/0162753 A1 | 6/2012 | Tatsuno | |

FOREIGN PATENT DOCUMENTS

| | | |
|---|---|---|
| JP | 2007-328232 | 12/2007 |
| JP | 2008-90200 A | 4/2008 |
| JP | 2008-96984 A | 4/2008 |
| JP | 4210314 | 1/2009 |
| JP | 2009-145672 | 7/2009 |
| JP | 2009-157223 | 7/2009 |
| JP | 4329863 | 9/2009 |
| JP | 2009-251458 | 10/2009 |
| JP | 2011-85922 A | 4/2011 |

OTHER PUBLICATIONS

JP Office Action issued Oct. 14, 2014 in Japanese Application No. 2011-202691.

* cited by examiner

FIG.20

| plane number | radius of curvature | interval | refractive index, Abbe's number | aperture radius | eccentricity Y (LB end part to optical axis) | aspherical surface |
|---|---|---|---|---|---|---|
| 0(DMD) | 1.0E+18 | 1.100 | | | 0 | |
| 1 | 1.0E+18 | 1.050 | 1.516798 64.10 | | 0 | |
| 2 | 1.0E+18 | 37.511 | | | 0 | |
| 3(diaphragm) | 1.0E+18 | 0.000 | | 7 | −1.560 | |
| 4 | 21.0616 | 3.589 | 1.517600 63.5 | | −1.560 | ● |
| 5 | −1.3E+02 | 0.100 | | | −1.560 | ● |
| 6 | 60.9542 | 0.900 | 1.883000 40.80 | | −1.560 | |
| 7 | 12.3278 | 8.525 | 1.487489 70.44 | | −1.560 | |
| 8 | −21.7193 | 0.100 | | | −1.560 | |
| 9 | −80.7180 | 2.900 | 1.719013 30.84 | | −1.560 | |
| 10 | 52.5721 | 1.192 | | | −1.560 | |
| 11 | 20.2544 | 6.018 | 1.581810 41.17 | | −1.560 | |
| 12 | −16.4629 | 0.973 | 1.904000 31.30 | | −1.560 | |
| 13 | −29.4138 | 7.280 | | | −1.560 | |
| 14 | 1.0E+18 | 0.000 | | | −1.560 | |
| 15 | −737.0756 | 0.900 | 1.502194 68.83 | 7.4 | −1.560 | |
| 16 | 24.0244 | 0.300 | | 7.4 | −1.560 | |
| 17 | 15.2620 | 5.000 | 1.706797 29.84 | 9.1 | −1.560 | |
| 18 | −47.7023 | 1.745 | | 9.1 | −1.560 | |
| 19 | −23.6586 | 1.100 | 1.904000 31.30 | | −1.560 | |
| 20 | 15.5688 | 3.698 | | | −1.560 | |
| 21 | −20.2538 | 2.100 | 1.531590 55.8 | | −1.560 | ● |
| 22 | −35.7110 | 8.680 | | | −1.560 | ● |
| 23 | −17.2048 | 3.763 | 15.31590 55.8 | | −1.560 | ● |
| 24 | −14.6151 | 24.770 | | | −1.560 | ● |

FIG.21

| plane number | 4 | 5 | 21 | 22 | 23 | 24 |
|---|---|---|---|---|---|---|
| fourth coefficient (E4) | 7.416275E-05 | 8.857986E-05 | 1.252837E-04 | 8.609800E-05 | 2.515713E-05 | 2.590017E-05 |
| sixth coefficient (E6) | 2.074740E-07 | 2.750710E-07 | 2.866321E-06 | 2.375690E-07 | -1.000793E-06 | -6.238096E-07 |
| eighth coefficient (E8) | 5.274898E-09 | 2.760577E-09 | -1.166681E-07 | -1.629372E-08 | 8.705097E-09 | 1.014559E-08 |
| tenth coefficient (E10) | -1.666298E-11 | 4.115343E-11 | 2.492616E-09 | 2.036335E-10 | -1.899131E-11 | -1.315813E-10 |
| twelfth coefficient (E12) | -1.657250E-13 | -8.274800E-13 | -2.776107E-11 | -6.003102E-13 | -8.301279E-14 | 1.169057E-12 |
| fourteenth coefficient (E14) | 7.852351E-15 | 1.252620E-14 | 1.615320E-13 | -4.683342E-15 | -3.504498E-17 | -5.487696E-15 |
| sixteenth coefficient (E16) | 2.855659E-17 | 7.065636E-17 | -3.215843E-16 | 3.675703E-17 | 2.511070E-18 | 1.055394E-17 |

FIG.22A

| | |
|---|---:|
| C | 0 |
| K: Conic constant | 0 |
| C2: y | 0 |
| C3: x**2 | 5.866757E-03 |
| C4: y**2 | 2.318685E-03 |
| C5: x**2*y | 3.439305E-05 |
| C6: y**3 | 3.716809E-06 |
| C7: x**4 | 2.096684E-07 |
| C8: x**2*y**2 | 4.725012E-07 |
| C9: y**4 | 9.431793E-08 |
| C10: x**4*y | 3.970253E-09 |
| C11: x**2*y**3 | 5.751713E-09 |
| C12: y**5 | -1.826627E-09 |
| C13: x**6 | -1.214379E-10 |
| C14: x**4*y**2 | 7.999683E-12 |
| C15: x**2*y**4 | -1.080515E-10 |
| C16: y**6 | 1.569398E-10 |
| C17: x**6*y | -4.117673E-12 |
| C18: x4y3 | -1.998693E-12 |
| C19: x2y5 | 4.163005E-12 |
| C20: y**7 | -3.742220E-12 |
| C21: x**8 | 1.020483E-13 |
| C22: x**6*y**2 | -3.119203E-14 |
| C23: x**4*y**4 | 1.398034E-13 |
| C24: x**2*y**6 | -2.348514E-14 |
| C25: y**8 | -4.532417E-14 |
| C26: x**8*y | 3.112801E-15 |
| C27: x**6*y**3 | 2.784611E-15 |
| C28: x**4*y**5 | -1.128068E-15 |
| C29: x**2*y**7 | 3.398303E-15 |
| C30: y**9 | 2.408328E-15 |
| C31: x**10 | -4.869393E-17 |
| C32: x**8*y**2 | 5.954255E-17 |
| C33: x**6*y**4 | -8.527970E-18 |
| C34: x**4*y**6 | -2.256822E-16 |
| C35: x**2*y**8 | 5.986575E-18 |
| C36: y**10 | 1.649588E-17 |
| C37: x**10*y | -1.052684E-18 |

FIG.22B

| C | 0 |
|---|---|
| K: Conic constant | 0 |
| C38: x**8*y**3 | -2.459156E-18 |
| C39: x**6*y**5 | -9.174022E-19 |
| C40: x**4*y**7 | 3.612815E-18 |
| C41: x**2*y**9 | -5.350218E-18 |
| C42: y**11 | -8.824203E-19 |
| C43: x**12 | 1.298263E-20 |
| C44: x**10*y*2 | -3.046637E-20 |
| C45: x**8*y**4 | -2.306291E-20 |
| C46: x**6*y**6 | 1.630150E-19 |
| C47: x**4*y**8 | 3.886851E-21 |
| C48: x**2*y**10 | 9.864038E-20 |
| C49: y**12 | -8.426835E-21 |
| C50: x**12*y | 1.460937E-22 |
| C51: x**10*y**3 | 1.095031E-21 |
| C52: x**8*y**5 | 5.236515E-22 |
| C53: x**6*y**7 | -3.033300E-21 |
| C54: x**4*y**9 | 1.637244E-21 |
| C55: x**2*y**11 | 2.495311E-22 |
| C56: y**13 | 4.066596E-22 |
| C57: x**14 | -1.461270E-24 |
| C58: x**12*y**2 | 5.275013E-24 |
| C59: x**10*y**4 | 4.335473E-24 |
| C60: x**8*y**6 | -2.725007E-23 |
| C61: x**6*y**8 | 2.048197E-24 |
| C62: x**4*y**10 | -4.990440E-23 |
| C63: x**2*y**12 | -1.758478E-23 |
| C64: y**14 | -3.611435E-24 |
| C65: x**14*y | -3.771134E-27 |
| C66: x**12*y**3 | -1.804780E-25 |
| C67: x**10*y**5 | 7.697891E-28 |
| C68: x**8*y**7 | 3.427100E-25 |
| C69: x**6*y**9 | 1.715807E-25 |
| C70: x**4*y**11 | 3.498456E-25 |
| C71: x**2*y**13 | 1.057061E-25 |
| C72: y**15 | 8.925445E-27 |

FIG.23

| reference vertices in plane of lens closest to first mirror | X | Y | Z | α |
|---|---|---|---|---|
| first mirror (plane mirror) | 0 | 0 | 59.7697 | −45 |
| second mirror (concave mirror) | 0 | 55 | −5.5303 | −39.7 |
| first surface of dust-proof glass | 0 | 55 | 62.7697 | 0 |
| second surface of dust-proof glass | 0 | 55 | 65.7697 | 0 |
| screen | 0 | −130 | | −90 |

PROJECTION OPTICAL SYSTEM AND IMAGE DISPLAY APPARATUS

BACKGROUND OF THE INVENTION

1. Field of the Invention

The disclosures discussed herein relate to a projection optical system and an image display apparatus having the projection optical system capable of enlarging an image to display the enlarged image on a screen.

2. Description of the Related Art

There is an image display apparatus having a projection optical system known in the art, which is capable of being placed at a relatively closer position to a screen than a position at which the related art image display apparatus is allowed to be placed. Such an image display apparatus is called a "close range projector". The purposes of the close range projector being devised are as follows. First, the projector will not project light too bright to blind a presenter or a demonstrator who stands close to the screen, and secondly, the projector will not emit an exhaust gas or noise to adversely affect the audience who watches and listens to the presentation.

Such a close range projector may utilize a related-art projection optical system (coaxial and rotationally symmetric) to reduce a distance between the projector and a screen surface by widening the angle of view of the projection optical system, or may utilize a curved mirror. Thus, the close range projector having the related-art projection optical system capable of widening the angle of view may achieve the aforementioned purposes by improving the related-art technology. However, in the above related-art projection optical system, an outer diameter of a lens arranged close to the screen side may need to be increased, which may result in an increase in the size of the projector itself. By contrast, the close range projector having the curved mirror may be capable of projecting light at an extremely close range without increasing the size of the projector itself.

Examples of the close range projector utilizing the curved mirror are disclosed in Japanese Patent No. 4329863 (hereinafter called "Patent Document 1") and Japanese Patent No. 3727543 (hereinafter called "Patent Document 2"). In the close range projector disclosed in Patent Document 1, a concave mirror is arranged behind the lens optical system for projecting light. In the close range projector disclosed in Patent Document 2, a convex mirror is arranged behind the lens optical system for projecting light. In either cases, arrangement accuracy between the components may be improved by simply arranging lenses and a mirror sequentially. However, in both cases, a long distance may be required between the lens optical system and the mirror, which may result in an increase in the size of the projection optical system.

Meanwhile, examples of the close range projector capable of reducing a distance between the lens optical system and the mirror are disclosed in Japanese Laid-open Patent Publication No. 2009-157223 (hereinafter called "Patent Document 3") and Japanese Laid-open Patent Publication No. 2009-145672 (hereinafter called "Patent Document 4"). These close range projectors disclosed in Patent Document 3 and Patent Document 4 include a reflector configured to bend or fold an optical path having a long distance between the lens optical system and the reflector, which may reduce the size of the projection optical system.

In the projector disclosed in Patent Document 3, the size of the projection optical system may be reduced by sequentially arranging a concave mirror and a convex mirror and a convex mirror subsequent to the lens optical system. In the projector disclosed in Patent Document 4, the size of the projection optical system may be reduced by arranging a plane mirror behind a concave mirror.

However, either of the projection optical systems disclosed in Patent Documents 3 and 4 have a long distance between an image display device and a curved mirror. Hence, if a user desires to place the projector main body further at a position closer to the screen than allowable positions at which the related art projectors are placed, a length of the projection optical system itself may become an obstacle.

Japanese Patent No. 4210314 (hereinafter called "Patent Document 5") discloses a technology for resolving such a limitation of "the size of the projection optical system itself". More specifically, Patent Document 5 discloses a projection optical system having an image display device, a display surface of which is orthogonal to a screen surface. With this vertical configuration, the projector main body may be capable of being placed even closer to the screen than the allowable positions of the related art projectors because the obstacle due to the length of the projection optical system itself may be resolved or eliminated.

However, although the projection optical system has the vertical configuration such as the one disclosed in Patent Document 5, which is capable of projecting an image at an extremely close range while reducing its size, divergence of light incident upon a mirror system from the lens optical system may need to be increased in order for the projector placed closer to the screen to display a larger image on the screen projection. However, if divergence of light is increased, the following three problems may occur.

That is, first, it may become difficult to correct aberration of projection luminous flux passing through parts other than an optical axis of the lens system. Second, the diffused luminous flux strikes a lens surface closest to the first mirror before striking the concave mirror. Third, the light reflected off the concave mirror strikes the first mirror in the middle of a route toward the screen before reaching the screen.

As illustrated in the technology disclosed in Patent Document 5, if a lens surface closest to the first mirror is concave, each of lens surfaces is gradually protruded toward the first mirror side with the increasing distance from an optical axis to the position of a corresponding lens. Further, in view of aberration correction and error sensitivity, when a lens surface closest to the mirror is concave, the refracting angle of the beam is extremely large in the projection optical system that manages the luminous flux having increased divergence. Hence, it may become difficult to correct aberration in an entire region of the screen. In this case, since the refracting angle of the beam is large, image quality may drastically deteriorate even if the slightest shifts are present in the arrangement of the components of the projection optical system.

Further, in the vertical projection optical system disclosed in Patent Document 5 having a projector lens arranged parallel to the screen, particles such as dust may be easily attached to the projector lens or mirrors compared to the projector lens in a horizontal projection optical system having a projection optical system arranged orthogonal to the screen. In addition, in the configuration of the above case, attached dust may fall onto the vertical projection optical system. Accordingly, if particles or dust attached to the projection system remain attached, the attached particles may be displayed on the screen without automatically coming off from the projector lens due to the gravitational effect.

Moreover, since the angle of view of the lens optical system is narrow in the projection optical system disclosed in Patent Document 5, the particles attached to one of the two mirrors, each of which causes the projection luminous flux to reflect off its surface, may affect the amount of light projected onto a projection surface of the screen. In this case, even if a dustproof glass is arranged between the mirror and the projection surface of the screen on which the projection light is projected, it may be difficult to prevent fine particles or dust having a size of 0.01 mm or less from intruding onto the projection surface.

RELATED ART DOCUMENT

Patent Document

Patent Document 1: Japanese Patent No. 4329863
Patent Document 2: Japanese Patent No. 3727543
Patent Document 3: Japanese Laid-open Patent Publication No. 2009-157223
Patent Document 4: Japanese Laid-open Patent Publication No. 2009-145672
Patent Document 5: Japanese Patent No. 4210314

SUMMARY OF THE INVENTION

Accordingly, it is a general object of an embodiment of the present invention to provide a projection optical system and an image display apparatus having the projection optical system capable of projecting an enlarged image on a screen when an image is projected from a position closer to a projection surface of the screen.

Further, it is an additional object of the embodiment of the present invention to provide a projection optical system and an image display apparatus having a vertical projection optical system capable of preventing an adverse effect on the amount of light projected onto a projection surface due to particles such as dust.

According to one embodiment, there is provided a projection optical system for use in an image display apparatus having an illumination optical system configured to apply light emitted from a light source, and an image display device configured to receive the light applied from the illumination optical system to form a projection image. The projection optical system includes a projector lens composed of a plurality of lenses; a first mirror; and a second mirror formed of a concave mirror, the projection optical system being configured to project the projection image formed by the image display device onto a projection surface. In the projection optical system, a projection luminous flux passing through the projector lens to be incident on the first mirror is a luminous flux exhibiting divergence. Further, in the projection optical system, the projection luminous flux reflected off the second mirror after having reflected off the first mirror is converged once, and the once converged projection luminous flux is then projected onto the projection surface. Further, in the projection optical system, a lens surface of a lens located closest to the first mirror among the lenses of the projector lens is convex.

According to another embodiment, there is provided a projection optical system for use in an image display apparatus having an illumination optical system configured to apply light emitted from a light source, and an image display device configured to receive the light applied from the illumination optical system to form a projection image. The projection optical system includes a lens optical system composed of a plurality of lens groups; and a mirror optical system composed of a first mirror, and a second mirror formed of a concave mirror, the projection optical system being configured to project the projection image formed by the image display device onto a projection surface. In the projection optical system, an intermediate image is formed between the first mirror and the second mirror, the intermediate image being composed of pixels associated with the image display device located closest to an optical axis of the lens optical system, and a lens surface of a lens group located closest to the first mirror among the lens groups of the lens optical system is convex.

According to another embodiment, there is provided an image display apparatus that includes one of the above projection optical systems; an illumination optical system configured to apply light emitted from a light source; and an image display device configured to receive the light applied from the illumination optical system to form a projection image.

Additional objects and advantages of the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

Other objects and further features of embodiments will be apparent from the following detailed description when read in conjunction with the accompanying drawings, in which:

FIG. 20 is a table illustrating a configuration of a coaxial projection optical system;

FIG. 21 is a table illustrating aspherical coefficients of respective planes;

FIGS. 22A and 22B represent a table illustrating coefficients for forming a reflection plane of the second mirror 10; and FIG. 23 is a table illustrating a layout of a first mirror 9, a second mirror 10 and a dustproof glass 11.

DESCRIPTION OF THE PREFERRED EMBODIMENTS

Preferred embodiments are described below with reference to the accompanying drawings.

Figure 1:
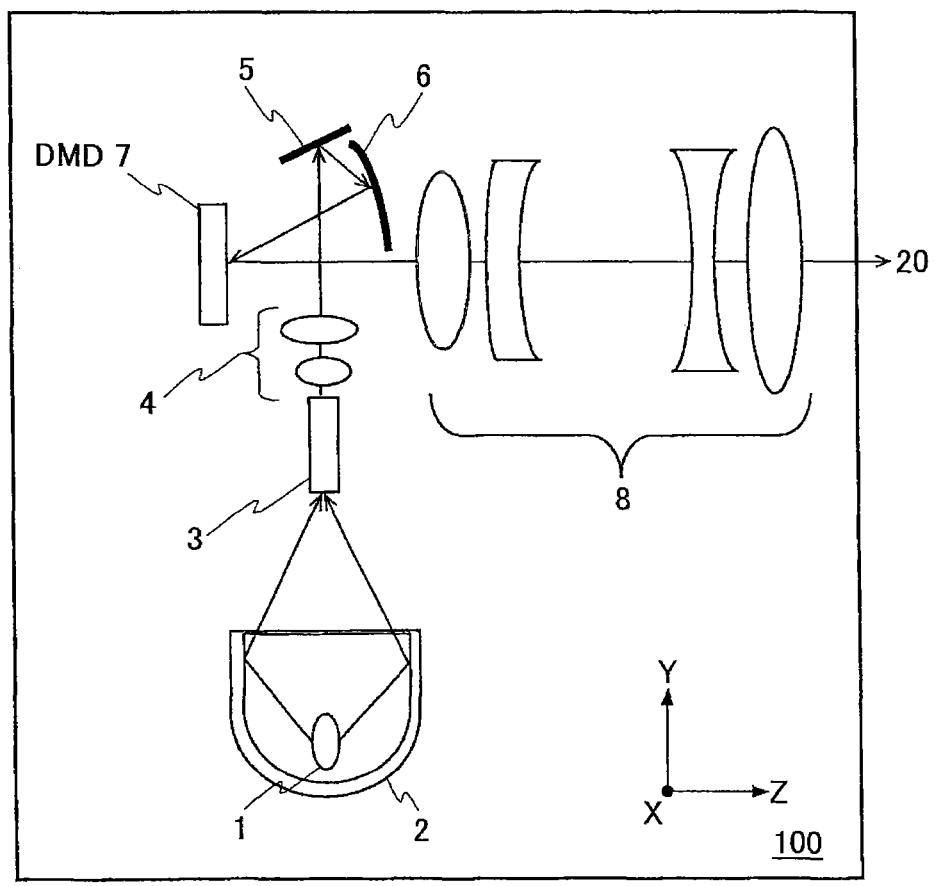
FIG. 1 is an optical layout schematically illustrating an example of an image display apparatus according to an embodiment.

Preferred embodiments of an image display apparatus are described below with reference to the accompanying drawings. FIG. 1 is a side view illustrating an example of a main part of an optical engine provided in an image forming apparatus according to an embodiment. In the following description, a Z-axis represents an optical axis direction of a projection optical system, a Y-axis represents an optical axis direction of an illumination optical system, and an X-axis represents an optical axis direction orthogonal to the Z-axis and the Y-axis.

In FIG. 1, a projector 100 includes an illumination optical system configured to illuminate a digital micromirror device (DMD) 7 serving as a reflection image display device utilizing light emitted from a lamp 1 serving as a light source, a projection optical system configured to project light reflected off the DMD in a direction toward a screen 20 serving as a projection plane. FIG. 1 only illustrates a lens optical system 8 that is a part of the projection optical system.

Note that the DMD serving as a reflection image display device is employed as an example of the image display device in the following embodiments. However, the image display apparatus according to the embodiments includes an image display device that is not limited to the DMD. The image display apparatus according to the embodiments may include other types of image display devices such as a liquid crystal panel.

Next, an illumination optical system provided in the projector 100 is described below. Light emitted from the lamp 1 serving as a light source is converged or collected by a reflector 2 at an entrance of an integrator rod 3. The integrator rod 3 may, for example, be a light pipe formed by combining four mirrors in a form of a tunnel. The light converged at the entrance of the integrator rod 3 repeatedly reflects off surfaces of the mirrors inside the integrator rod 3, and hence, light intensity may become uniform at an exit of the integrator rod 3.

The exit of the integrator rod 3 may serve as a surface light source configured to emit light having uniform light intensity.

Accordingly, a light source image from the surface light source may be formed in an effective image region of the DMD 7 serving as the image display device via a DMD illumination lens 4, a first reflector 5, and a second reflector 6. The DMD illumination lens 4 serves as an optical device for effectively applying light to the effective image region of the DMD 7. The first reflector 5 is formed of a plane mirror and the second reflector 6 is formed of a curved mirror (i.e., a concave mirror).

The light emitted from the integrator rod 3 passes through the front of the DMD illumination lens 4 and reflects off the first reflector 5 so that the light reflected off the first reflector 5 is reflected in a lower right direction to travel in a direction toward the second reflector 6 as illustrated in FIG. 1. The light reflected off the second reflector 6 illuminates a surface of the DMD 7 and the light illuminating the surface of the DMD 7 further reflects off a mirror within the effective image region of the DMD 7. Hence, the reflected luminous flux corresponding to image projection light passes right beside the second reflector 6 to be incident upon a lens optical system 8 that constitutes a projection optical system. The illumination optical system includes the lamp 1 and the second reflector 6.

Since the illumination optical system illuminates the DMD 7 with a uniform amount of luminous light, the DMD 7 exhibits uniform illumination distribution. Hence, a projection image enlarged by the light projected from the illumination optical system via the DMD 7 also exhibits uniform illumination distribution.

The DMD 7 is composed of numerous micromirrors, respective angles of which may vary within a range of +12 to −12 degrees. For example, if the angle of each micromirror is −12 degrees, light reflected off the micromirror may be configured to be incident on the projector lens. This state is called an "ON state". For example, if the angle of the micromirror is +12 degrees, light reflected off the micromirror may be configured not to be incident on the projector lens. This state is called an "OFF state".

The micromirrors of the DMD 7 correspond to pixels of an image displayed on a projection plane. Accordingly, projection light (projection image light) forming an image displayed on the screen 20 may be projected via the projection optical system by controlling angles of inclination of the micromirrors of the DMD 7.

FIG. 1 only illustrates a lens optical system 8, and illustration of a mirror optical system included in the projection optical system is omitted from FIG. 1. The lens optical system 8 includes a projector lens composed of plural lenses and a lens barrel holding the projector lens. Note that illustration of the lens barrel is omitted from FIG. 1. Note also that the not-illustrated mirror optical system includes a mirror configured to reflect off the projection luminous flux obtained from the projector lens in a direction toward the screen 20.

First Embodiment

Figure 2:
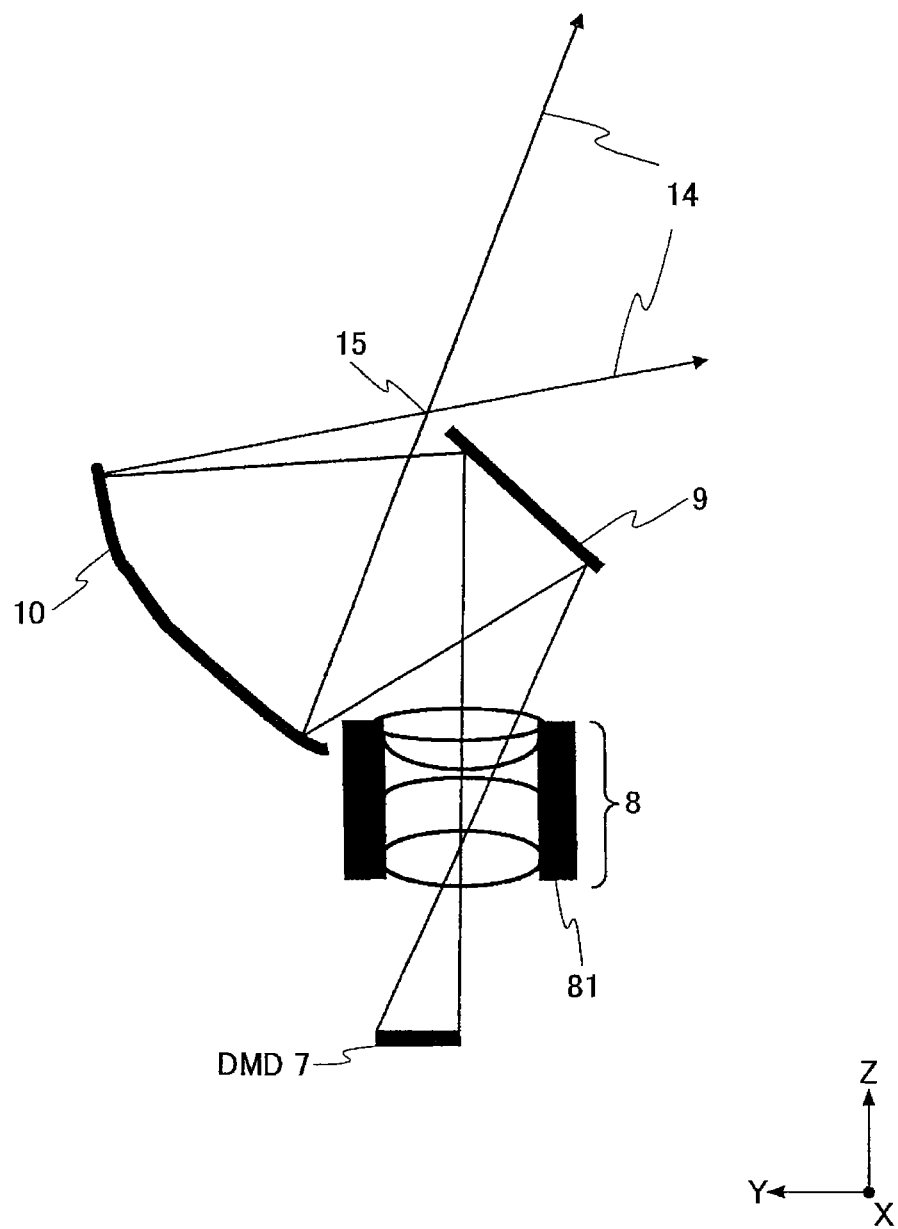
FIG. 2 is a side view illustrating an example of a main part of a projection optical system provided in an image display apparatus according to an embodiment.

Next, a projection optical system provided in an image display apparatus according to a first embodiment is described. FIG. 2 is a schematic diagram illustrating an enlarged main part of the projection optical system provided in an image display apparatus according to the first embodiment. Note that illustration of an illumination optical system is omitted from FIG. 2. FIG. 2 illustrates the projection optical system configured to project an entire effective image region onto a screen 20 (not illustrated) serving as a projection surface while all the micromirrors of the DMD 7 are in ON states. In FIG. 2, a projection luminous flux 14 is incident on the lens optical system 8 from an end of the effective image region of the DMD 7. The projection luminous flux is expressed as two lines reaching the screen 20 (not illustrated) via the first mirror 9 and the second mirror 10 that constitutes parts of a mirror optical system 8.

The lens optical system 8 is composed of plural lenses assembled inside a lens barrel 81. The projection luminous flux 14 is converged inside the lens barrel 81, and the converged projection luminous flux 14 then travels in a direction toward the first mirror 9 while diffusing. The first mirror 9 is not limited to a plane mirror. If the first mirror 9 is a convex mirror, the projection luminous flux 14 reflected off the first mirror 9 may exhibit increased divergence. In this case, the projection luminous flux 14 reflected off the first mirror 9 may, for example, collide with the lens barrel 81 in the middle of the route directed toward the second mirror 10. As a result, the projection luminous flux 14 may be blocked off (be shielded). Accordingly, it is preferable that the first mirror 9 be a plane mirror or a concave mirror.

Further, the second mirror 10 configured to reflect off the projection luminous flux 14 obtained from the first mirror 9 in a direction toward the screen 20 may need to be a concave mirror. If the second mirror 10 is a plane mirror or a convex mirror, the reflected projection luminous flux 14 may be diffused. Hence, the reflected projection luminous flux 14 does not travel in a direction toward the screen 20 (not-illustrated).

That is, if the first mirror 9 is a plane mirror or a convex mirror, and the second mirror 10 is a concave mirror, the projection luminous flux 14 reflected off the second mirror 10 diffuses after being converged or collected between the screen 20 and the second mirror 10. Accordingly, the projection luminous flux 14 is capable of being projected onto the screen 20.

In order to display an enlarged image on the screen 20 while placing the projector 100 extremely close to the screen 20, it may be necessary to enhance the divergence of the luminous flux incident on the mirror optical system from the lens optical system 8, converge the projection luminous flux 14 after being reflected off the second mirror 10 (concave mirror) provided in the mirror optical system, and set a converging position 15 at a position close to the second mirror 10 and distant from the screen 20.

If the converging position 15 is distant from the screen 20 but is not close to the second mirror 10, divergence of the projection luminous flux 14 obtained from the projector 100 set at a position extremely close to the screen 20 will not be sufficient. Accordingly, a large image will not be displayed on the screen 20.

Figure 3:
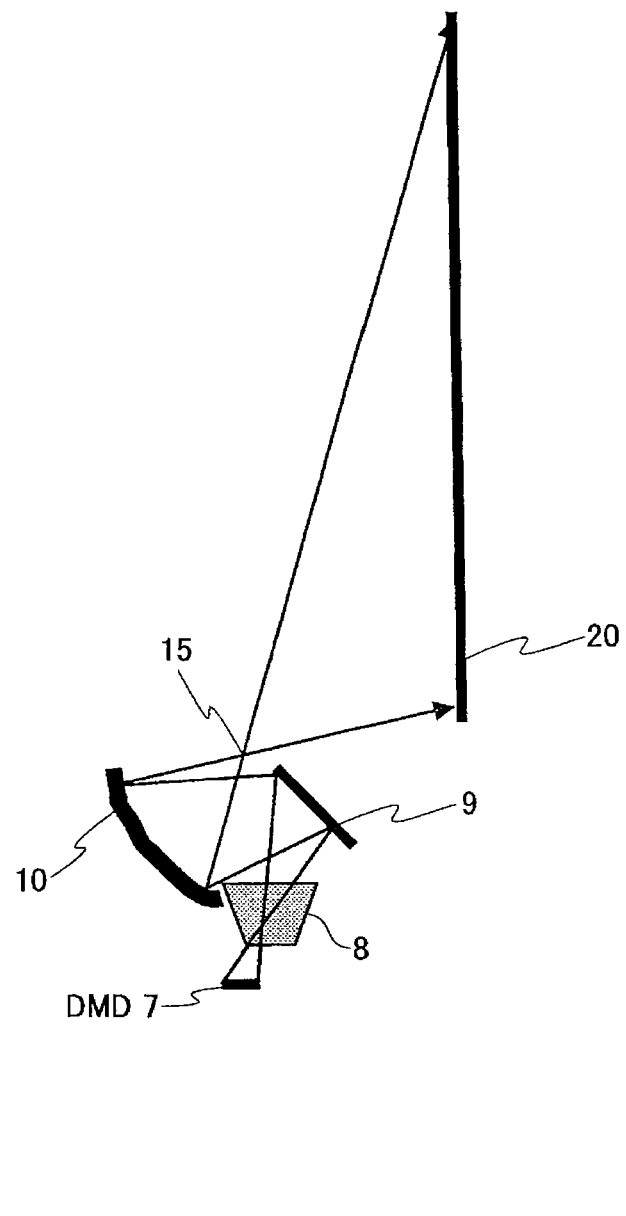
FIG. 3 is a ray diagram illustrating features of light projected by the projection optical system.

For example, as illustrated in FIG. 3, if the converging position 15 is distant from the screen 20 and is close to the second mirror 10, the projection luminous flux 14 from the projector 100 is sufficiently divergent even if the projector 100 is set at a position extremely close to the screen 20. Accordingly, the sufficiently divergent projection luminous flux 14 may be displayed as an enlarged image on an entire surface of the screen 20.

The converging position 15 is described further in detail below. It is preferable that the converging position 15 be farther distant from the screen 20 (i.e., closer to the second mirror 10); however, it is undesirable that the converging position 15 be too close to the second mirror 10. It is preferable that the converging position 15 be located at a position closer to the first mirror 9 than the second mirror 10 serving as a concave mirror.

Figure 4:
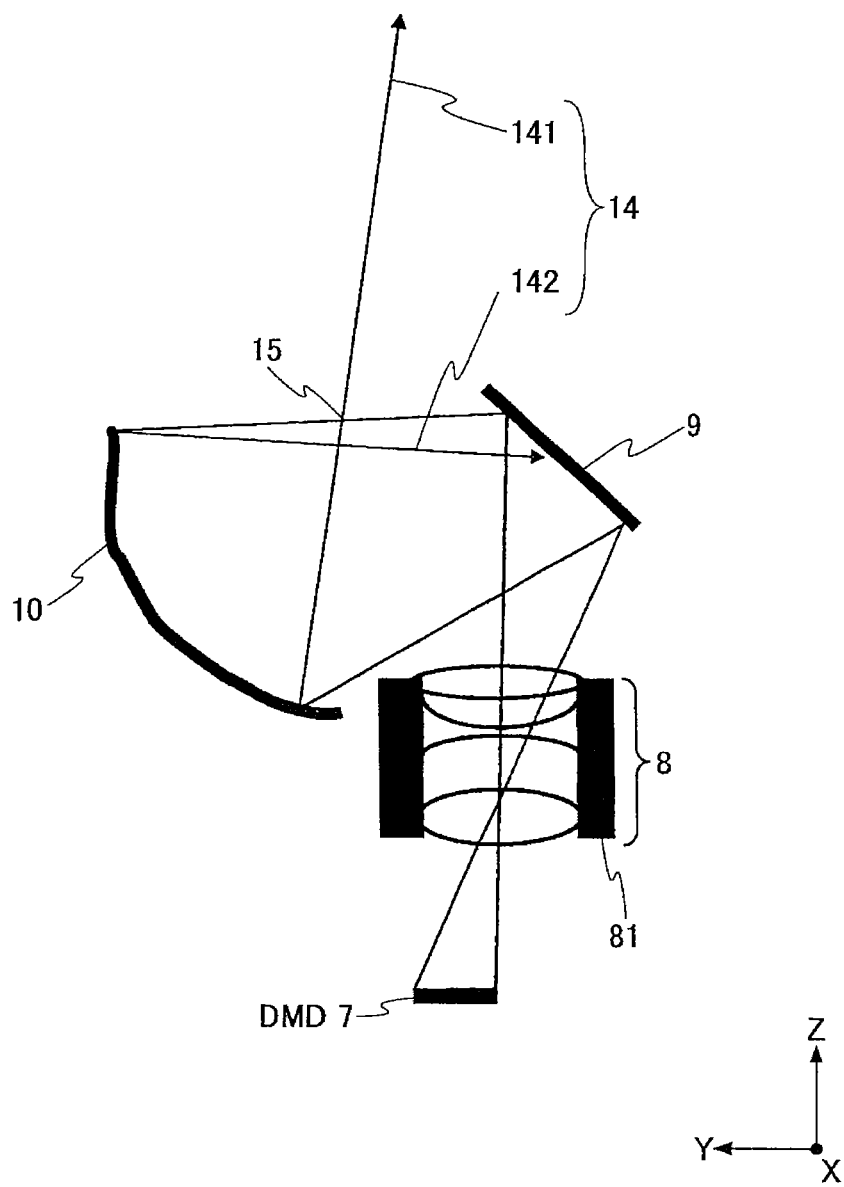
FIG. 4 is a side view illustrating an example of a main part of a projection optical system provided in the image display apparatus according to the embodiment.

The reason why the converging position 15 is desirable to be located at a position closer to the first mirror 9 than the second mirror 10 is given below with reference to FIG. 4. FIG. 4 is an enlarged view illustrating a main part of the projection optical system provided in the projector 100 according to the embodiment. In this example, the converging position 15 is located at a position closer to the second mirror 10 than the first mirror 9. The projection luminous flux 14 is converged at the converging position 15, and the converged projection luminous flux 14 is then diffused at once. In this case, if the converging position 15 is not close to the first mirror 9 but close to the second mirror 10 as illustrated in FIG. 4, the first mirror 9 may be placed on an optical path of the projection luminous flux 14 that diffuses from the converging position 15. In this case, part of the projection luminous flux 14 may be blocked off by the first mirror 9.

Figure 5:
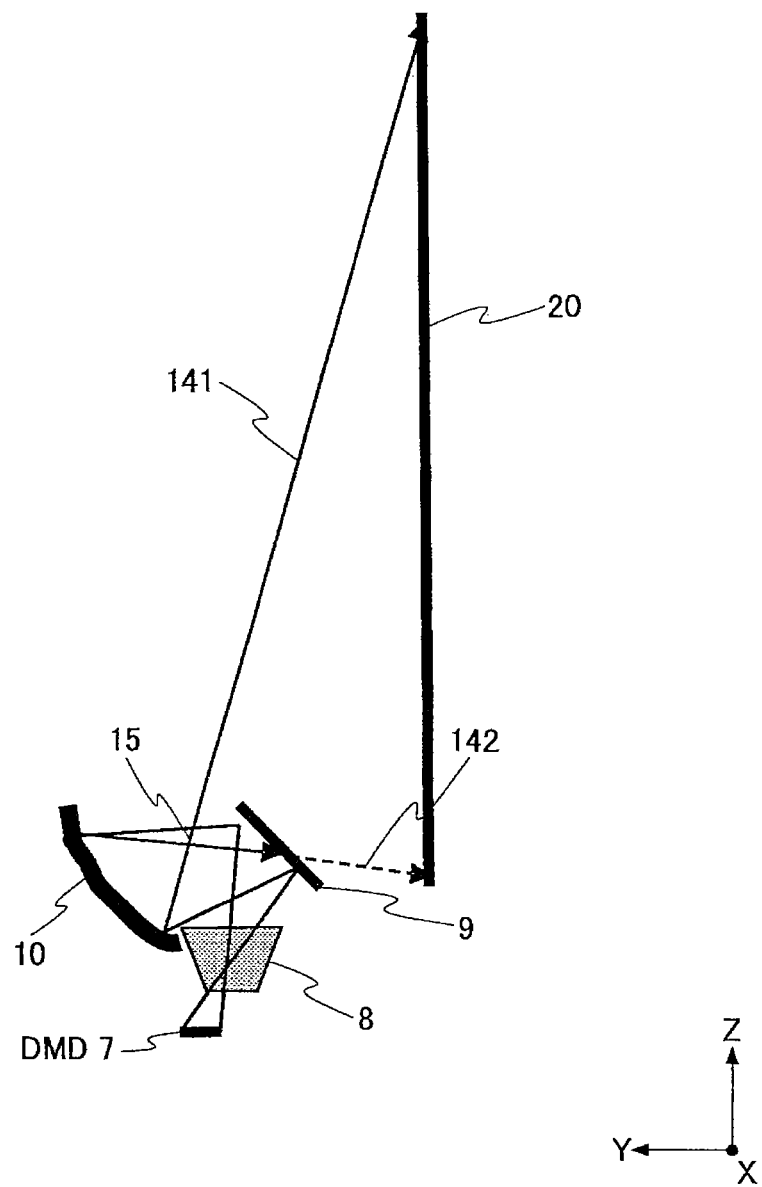
FIG. 5 is a ray diagram illustrating features of light projected by the projection optical system.

In FIG. 5, in comparing projection light 141 that strikes an edge of projection luminous flux 14 reflected off the second mirror 10 and traveling in a direction toward the screen 20 and projection light 142 that strikes another edge of the projection luminous flux 14, the projection light 141 is reflected off the second mirror 10 and projected onto the screen 20 via the converging position 15, whereas the projection light 142 reflected off the second mirror 10 travels to the converging position 15 but is then blocked off by the first mirror 9. As a result, an image expected to be displayed on the screen 20 with the projection luminous flux 14 may have missing parts. With this reason, it is preferable that the converging position 15 be close to the first mirror 9.

If the converging position 15 is not close to the first mirror 9 but is away from the first mirror 9, and is close to the second mirror 10 as described above, a part of the projection luminous flux 14 may be blocked off by the projection optical system. As a result, an enlarged image will not be able to be displayed on the screen 20. In the projector 100 according to the embodiment, the converging position 15 is set at a position farther away from the screen 20 and closer to the second mirror 10, and is closer to the first mirror 9. However, it is undesirable that the converging position 15 be much too close to the second mirror 9. With this configuration, the projector 100 according to the embodiment may be capable of displaying an enlarged image on the screen 20 at an extremely close range of the screen 20.

Further, if the converging position 15 is not close to the first mirror 9 but close to the second mirror 10, the projection light 142 that is a part of the projection luminous flux 14 has an angle to bow relative to the screen 20 that is parallel to an X-Z plane, compared to the projection light 141 reaching the screen 20. In other words, when an angle between a first edge (projection light 141) of the projection luminous flux 14 reflected off the second mirror 10 and a normal line (i.e., a line normal to tangential line) of the screen 20 and an angle between a second edge (projection light 142) and the normal line of the screen 20 have different signs (for the angles), the projection luminous flux 14 is blocked off by the lens optical system 8.

Accordingly, in the projector 100 according to the embodiment, each of angles formed between rays of light incident on an image projected on the screen serving as the projection surface at the center in a horizontal direction associated with the projection luminous flux 14 and the normal of the screen 20 has the same sign.

Second Embodiment

Figure 6:
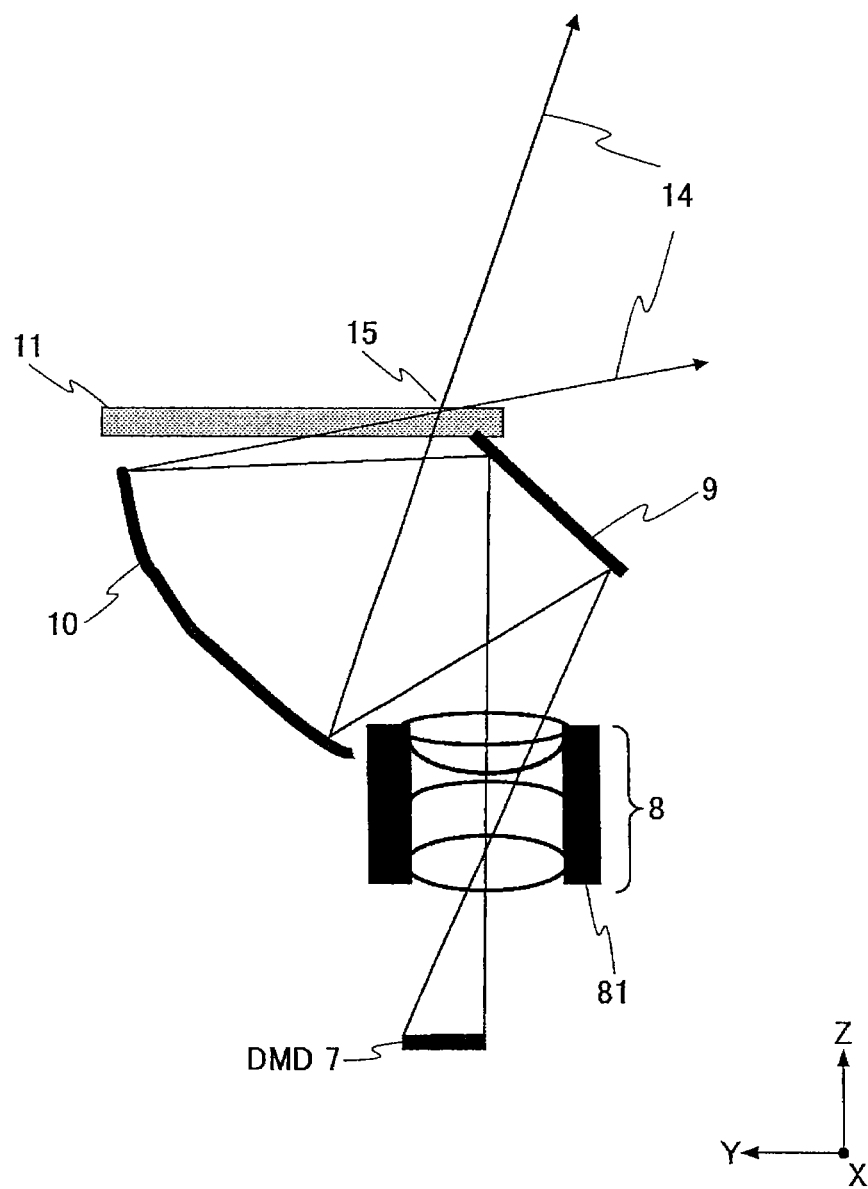
FIG. 6 is a side view illustrating another example of a main part of a projection optical system provided in an image display apparatus according to another embodiment.

Next, a projection optical system provided in an image display apparatus according to a second embodiment is described. FIG. 6 is a schematic diagram illustrating an enlarged main part of the projection optical system provided in an image display apparatus according to second embodiment.

The purposes of arranging dustproof glass 11 above the second mirror 10 in the projection optical system provided in the image display apparatus according to the second embodiment is to protect the second mirror 10 of the concave mirror and to prevent particles such as dust from intruding into the lens optical system 8. Note that the quality of the projected image will not deteriorate by arranging the dustproof glass 11 in the projection optical system.

It is preferable that the dustproof glass 11 be as small as possible in the projection optical system provided in the image display apparatus according to the second embodiment. That is, if the dustproof glass 11 is large, the projection optical system itself is large, which may result in an increase in the size of the projector 100.

The projection luminous flux 14 reflected off the second mirror 10 to travel toward the screen 20 (not illustrated) is converged once, and the once converged projection luminous flux 14 is then diffused. In order to achieve the purpose of arranging the dustproof glass 11 in the projection optical system without increasing the size of the dustproof glass 11, the projection optical system may be configured such that the converging position 15 is located close to the dustproof glass 11. As illustrated in FIG. 6, if the converging position 15 of the projection luminous flux 14 is located close to the dustproof glass 11, the size of the dustproof glass 11 is not necessarily be increased. Hence, the projection optical system may be reduced in size. However, if the converging position 15 of the projection luminous flux 14 is located away from the dustproof glass 11, the projection luminous flux 14 diffuses at once. Hence, the size of the dustproof glass 11 may need to be increased.

That is, in the projector 100 according to the embodiment, it is preferable to locate the converging position 15 at a position farther away from the screen 20 and close to the second mirror 10, and at a position closer to the first mirror 9 than the second mirror and closer to the dustproof glass 11 in order to satisfy the following three requirements: (1) the projection luminous flux 14 traveling in a direction from the second mirror 10 toward the screen 20 will not be blocked off, (2) the size of the entire projection optical system including the lens optical system 8, the first mirror 9, and the second mirror 10 may be reduced, and (3) the size of the dustproof glass 11 may be reduced. Note that the converging position 15 is a position at which the projection luminous flux 14 is converged after the projection luminous flux 14 has reflected off the second mirror 10.

Third Embodiment

Figure 7:
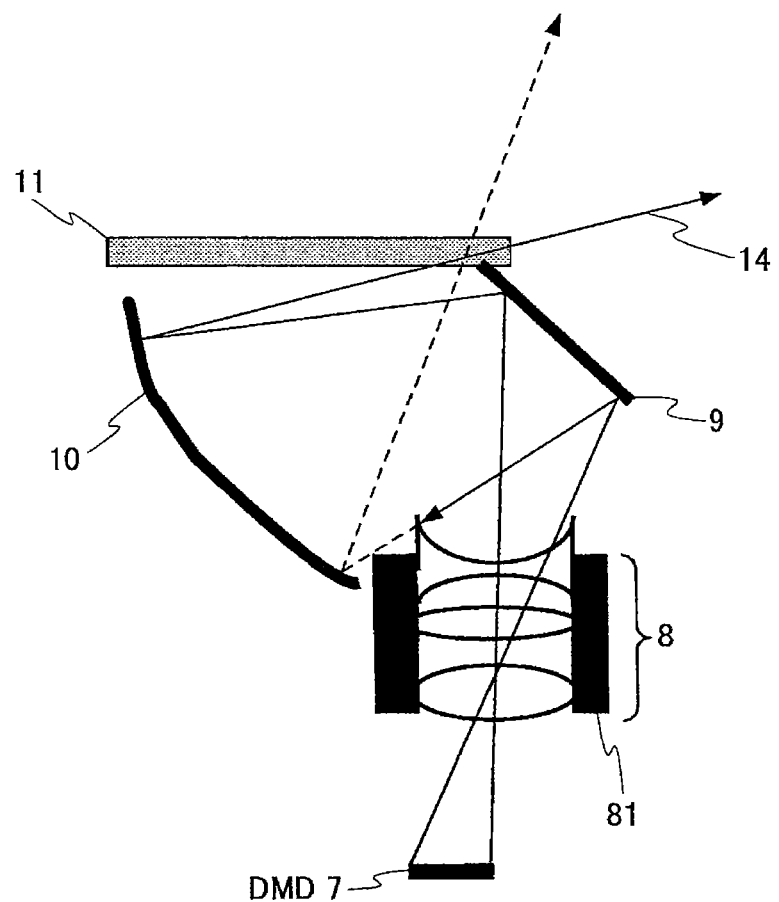
FIG. 7 is a side view illustrating an example of a main part of a projection optical system provided in an image display apparatus according to still another embodiment.

Next, a projection optical system provided in an image display apparatus according to a third embodiment is described. FIG. 7 is a schematic diagram illustrating features of the third embodiment, which is an enlarged main part of the projection optical system provided in the image display apparatus according to the third embodiment. The preferred location of the converging position 15 being closer to the dustproof glass 11 has been already described in the aforementioned second embodiment. If the first mirror 9 in the second embodiment illustrated in FIG. 6 rotates in a counterclockwise direction on paper, the converging position 15 is located at a position even closer to the dustproof glass 11 and the first mirror 9 as indicated by a broken line in FIG. 7. However, with this configuration, the projection luminous flux 14 that has reflected off the first mirror 9 may be susceptible to being blocked off by the lens optical system 8 or the lens barrel 81.

Specifically, if the lens arranged closest to the first mirror 9 among the lenses of the lens optical system 8 is concave (i.e., a concave lens), the projection luminous flux 14 reflected off the first mirror 9 is highly likely to strike an outer circumferential part of the concave lens.

On the other hand, if the angle of the first mirror 9 is rotated in a clockwise direction on paper, the projection luminous flux 14 may be adjusted such that the projection luminous flux 14 that has reflected off the first mirror 9 is not blocked off by the lens optical system 8 or the lens barrel 8. However, if the angle of the first mirror 9 is rotated in a clockwise direction on paper, an optical path of the projection luminous flux 14 that has reflected off the first mirror 9 is shifted in a direction away from an X-Y plane. In this case, the second mirror 10 may need to be shifted according to the shifted optical path of the projection luminous flux 14. That is, the second mirror 10 may need to be shifted in an upward direction on paper. If the second mirror 10 is shifted in the upward direction on paper, the projection optical system may become bulky.

Accordingly, in order to reduce the size of the projection optical system, the projection optical system may preferably be configured such that the projection luminous flux 14 that has reflected off the first mirror 9 passes through a position closest possible to the lens constituting the lens optical system 8 or the lens barrel 81 to reach the second mirror 10 while locating the converging position 15 close to the dustproof glass 11.

Figure 8:
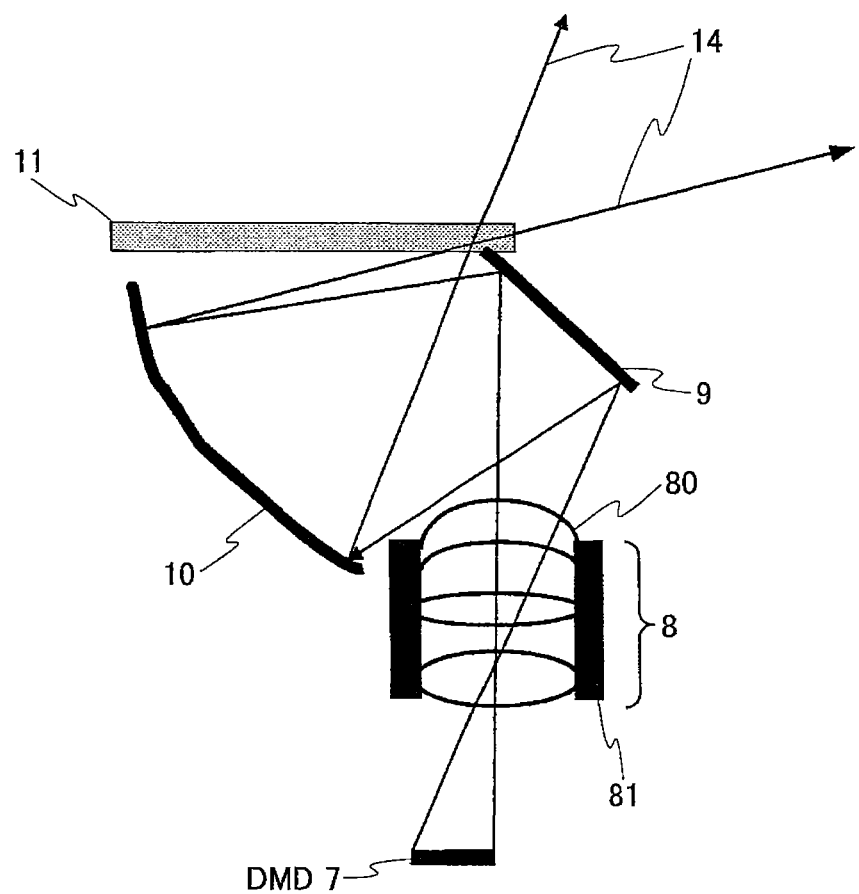
FIG. 8 is a side view illustrating an example of a main part of a projection optical system provided in an image display apparatus according to still another embodiment.

In order to obtain the projection optical system having the above configuration, a configuration of the lens optical system 8 may need to be improved. FIG. 8 is a view illustrating an example in which a lens located closest to the first mirror 9 among projector lenses of the lens optical system 8 has a convex lens surface. As illustrated in FIG. 8, in a case of the lens 80 having a convex lens surface, even if the projection luminous flux 14 passes through a position close to the lens 80, the projection luminous flux 14 will not be blocked off by the outer circumferential part of the lens 80 or an upper end of the lens barrel 81. Further, even if the projection luminous flux 14 that has reflected off the first mirror 9 has high divergence, the projection luminous flux 14 may be able to reach the second mirror 10.

According to the aforementioned third embodiment, aberration correction managing the projection luminous flux 14 having increased divergence may be performed, and error sensitivity may be reduced.

Fourth Embodiment

Figure 9:
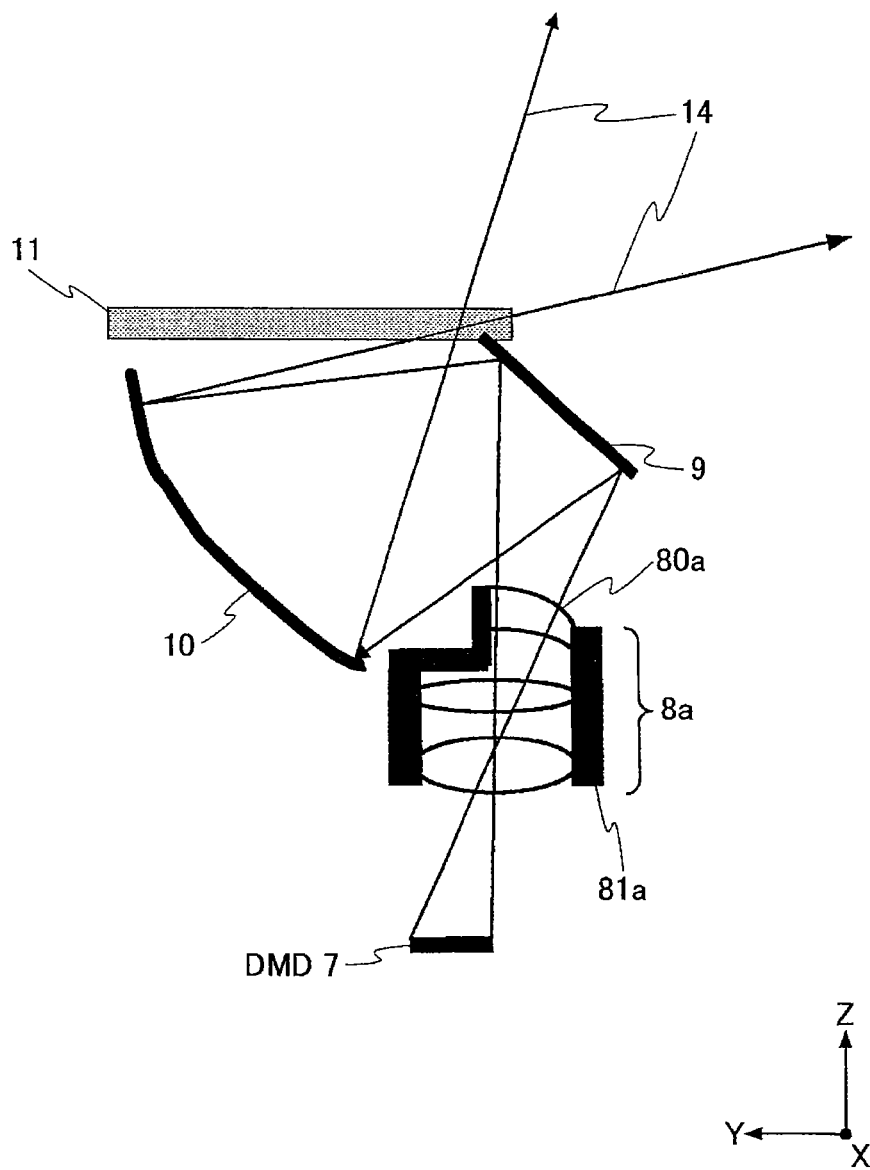
FIG. 9 is a side view illustrating an example of a main part of a projection optical system provided in an image display apparatus according to still another embodiment.

Next, a projection optical system provided in an image display apparatus according to a fourth embodiment is described. FIG. 9 is a schematic diagram illustrating features of the fourth embodiment, which is an enlarged main part of the projection optical system provided in the image display apparatus according to the fourth embodiment that manages divergence of the reflected luminous flux much higher than the divergence managed by the projection optical system provided in the image display apparatus according to the third embodiment.

In FIG. 9, a lens optical system 8a includes an atypical lens 80a arranged closest to the first mirror 9 and a lens barrel 81a holding the atypical lens 80a and the like. As illustrated in FIG. 9, among the lenses constituting the lens optical system 8a, the atypical lens 80a arranged closest to the first mirror 9 is cut out such that a diameter of the atypical lens 80a is reduced by half of the diameters of other lenses. As a result, a cutout part is formed in an end part on the first mirror 9 side of the lens optical system 80a. With this configuration, even if the projection luminous flux 14 that has reflected off the first mirror 9 has high divergence and thus exhibits a diffused optical path, the projection luminous flux 14 will not be blocked off by the lens optical system 8a and may be able to reach the second mirror 10.

Accordingly, a route allowing the projection luminous flux 14 to pass through may be widened by forming the cutout part in an end part of the lens barrel 81a and the lens 80a closest to the first mirror 9. Hence, the projector 100 may have the projection optical system that is reduced in size and weight, and may be capable of projecting an enlarged image onto the screen 20 at an extremely close range of the screen 20.

As is clear from rays of light illustrated in FIG. 9, the usable range of the lens 80a is a remaining part opposite to the cutout part of the lens 80a. Accordingly, the definition and the brightness of the image projected on the screen 20 will not be affected.

Fifth Embodiment

Figure 10:
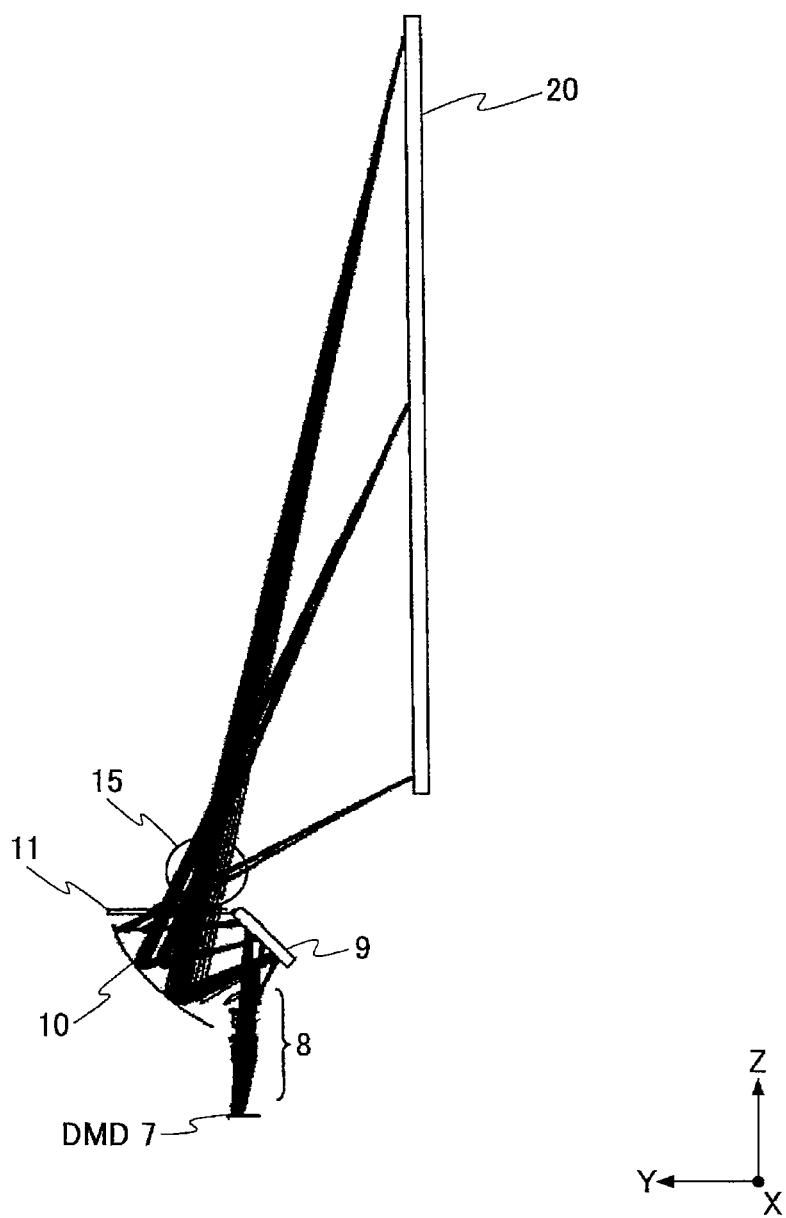
FIG. 10 is a ray diagram illustrating features of light projected by the projection optical system.
Figure 11:
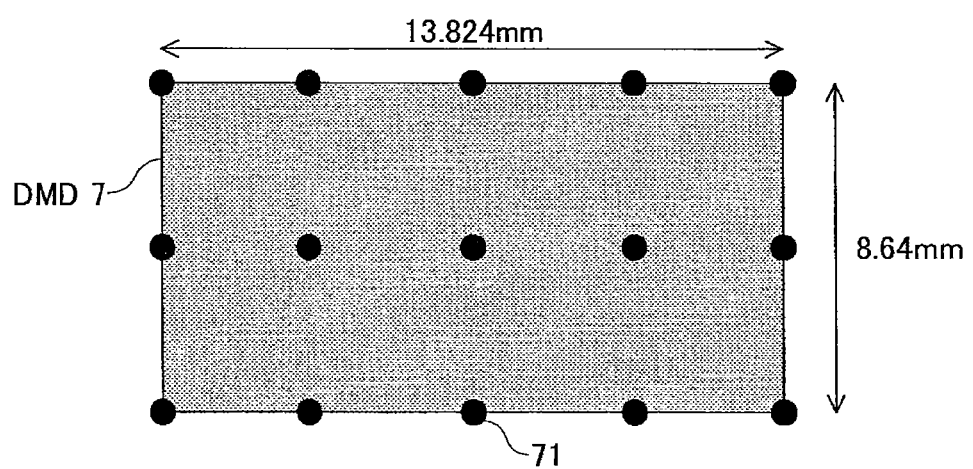
FIG. 11 is a plan view illustrating an example of a reflection image display device provided in the image display apparatus according to the embodiment.
Figure 11:
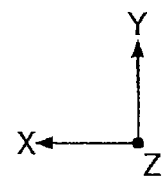

Next, a projection optical system provided in an image display apparatus according to a fifth embodiment is described. FIG. 10 is a ray diagram illustrating trajectory of light projected by the projection optical system. In FIG. 10, an optimal converging position 15 is formed by arranging the lens optical system 8, the first mirror 9, the second mirror 10 and the dustproof glass 11, and seven rays of light are traced from each of fifteen points on the DMD 7 illustrated in FIG. 11. FIG. 11 is a plan view of the DMD 7. In FIG. 11, among plural points on a plane of the DMD 7, a point 71 placed at a midpoint in an X-axis direction and at a lower end of the plane of the DMD 7 in a Y-axis direction is eccentrically arranged in the Y-axis direction. The amount of eccentricity is 1.56 cc.

The illustration of the embodiment continues by referring back to FIG. 10. As illustrated in FIG. 10, the collecting power of light at the converging position 15 is not narrowed as a spot; however, the projection optical system may be reduced in size by arranging the dustproof glass 11 at a position near the converging position 15.

Further, the projection luminous flux 14 will not be blocked off by the first mirror 9 by locating the converging position 15 at a position close to the first mirror 9, that is, by locating the converging position 15 close to an infinitely-wide virtual plane including a reflection plane of the first mirror 9. In addition, since the first mirror 9 may be arranged without having a distance from the second mirror 10, the projection optical system may be reduced in size.

Note that a projector having a configuration differing from that of the projector 100 utilized in the above embodiment is considered. The projector is configured such that the projection luminous flux 14 emitted from the DMD 7 is not reflected off the first mirror 9 but the projection luminous flux 14 having passed through the lens optical system 8 strikes the second mirror 10. In the projector having such a configuration, if the projection optical system is arranged on an exterior of the projector, a main body of the projector may collide with the screen 20. Accordingly, the projector having this configuration may not be placed at a close range of the screen 20. That is, the projector 100 utilized in the image display apparatus according to the above embodiment is configured such that the projection luminous flux 14 exhibiting high divergence is reflected via the first mirror 9 and the second mirror 10, and projected onto the screen 20. Accordingly, the image display apparatus according to the above embodiment having the projector 100 may be capable of projecting an image on the screen 20 from a position extremely close to the screen 20.

Figure 12:
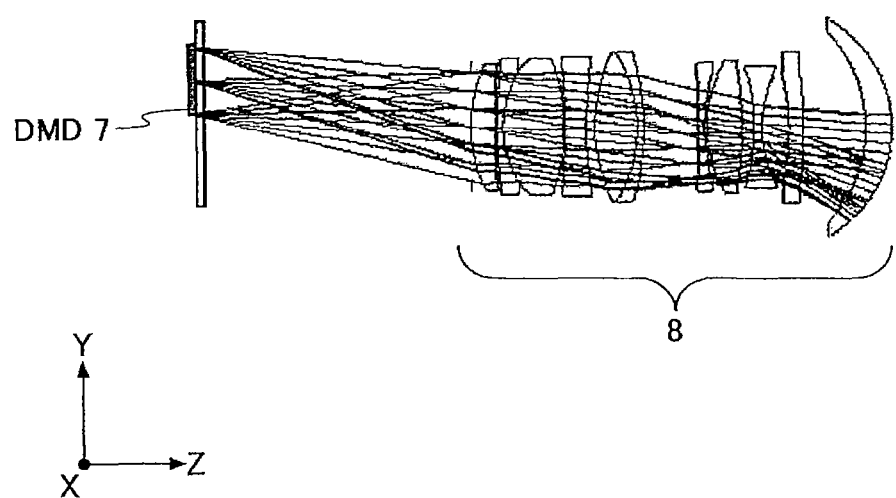
FIG. 12 is a side view illustrating an example of a lens optical system provided in the image display apparatus according to the embodiment.

FIG. 12 illustrates a configuration example of the lens optical system 8. In FIG. 12, the optical axis of the lenses is determined as a Z-axis and two other axis orthogonal to the Z-axis are determined as an X-axis and a Y-axis, respectively. The lens optical system 8 illustrated in FIG. 12 is a coaxial optical system in which the respective optical axes of the lenses are in the same straight lines.

Figure 18:
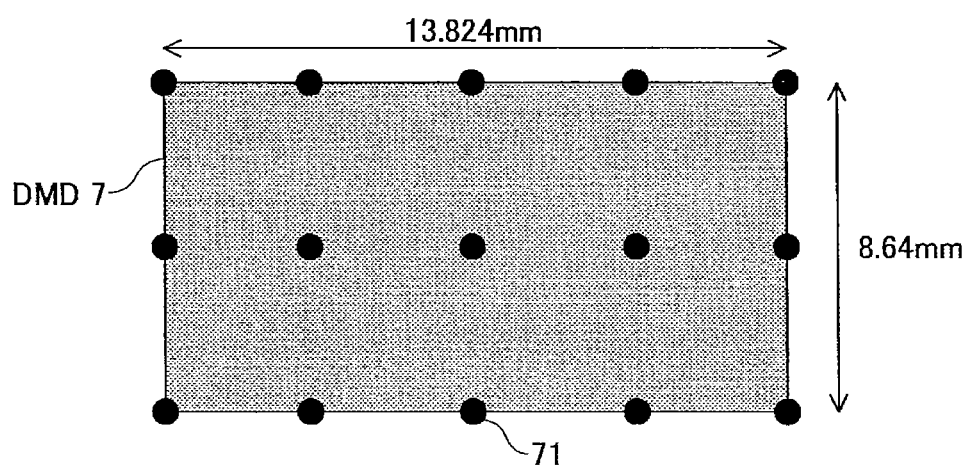
FIG. 18 is a plan view illustrating an example of a reflection image display device provided in the image display apparatus according to the embodiment.
Figure 18:
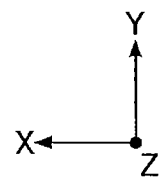

In FIG. 18, among plural points on a plane of the DMD 7 illustrated in FIG. 18, a point 71 on a lower end of the plane of the DMD 7 in the Y-axis direction is eccentrically arranged in the Y-axis direction, and the amount of eccentricity is 1.56 mm. That is, in FIG. 12, the optical axes of the DMD 7 are located 1.56 mm below the lower end of the DMD 7.

Sixth Embodiment

Figure 13:
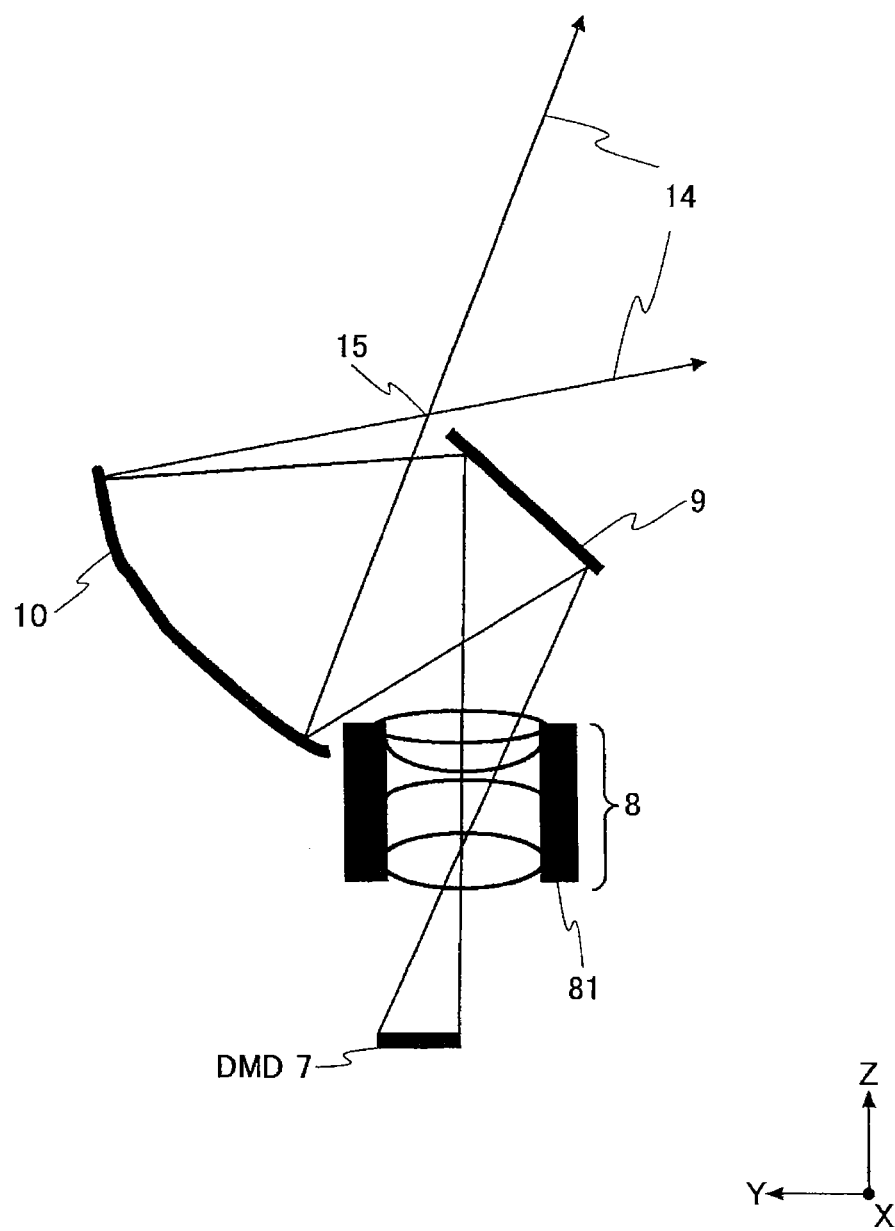
FIG. 13 is a side view illustrating an example of a main part of an projection optical system provided in an image display apparatus according to an embodiment.

Next, a projection optical system provided in an image display apparatus according to a sixth embodiment is described. FIG. 13 is a schematic diagram illustrating an enlarged main part of the projection optical system provided in the image display apparatus according to the sixth embodiment. Note that illustration of an illumination optical system is omitted from FIG. 13. FIG. 13 illustrates the projection optical system configured to project an entire effective image region onto a screen 20 (not illustrated) serving as a projection surface while all the micromirrors of the DMD 7 are in ON states. In FIG. 13, a projection luminous flux 14 is incident on the lens optical system 8 from an end of the effective image region of the DMD 7. The projection luminous flux is expressed as two lines reaching the screen 20 (not illustrated) via the first mirror 9 and the second mirror 10 that constitutes a mirror optical system 8.

The lens optical system 8 is composed of plural lenses assembled inside a lens barrel 81. The projection luminous flux 14 is converged inside the lens barrel 81 and the converged projection luminous flux 14 then travels in a direction toward the first mirror 9 while diffusing. The first mirror 9 is not limited to a plane mirror. If the first mirror 9 is a convex mirror, the projection luminous flux 14 that has reflected off the first mirror 9 may exhibit increased divergence. In this case, the projection luminous flux 14 reflected off the first mirror 9 may, for example, collide with the lens barrel 81 in the middle of the route directed toward the second mirror 10. As a result, the projection luminous flux 14 may be blocked off (be shielded). Accordingly, it is preferable that the first mirror 9 be a plane mirror or a concave mirror.

Further, the second mirror 10 configured to reflect off the projection luminous flux 14 having reflected off the first mirror 9 in a direction toward the screen 20 may need to be a concave mirror. If the second mirror 10 is a plane mirror or a convex mirror, the reflected projection luminous flux 14 may be diffused. In this case, the reflected projection luminous flux 14 will not travel in a direction toward the screen 20.

That is, if the first mirror 9 is a plane mirror or a convex mirror, and the second mirror 10 is a concave mirror, the projection luminous flux 14 that has reflected off the second mirror 10 diffuses after being converged or collected between the screen 20 and the second mirror 10. Accordingly, the projection luminous flux 14 is capable of being projected onto the screen 20.

In order to display an enlarged image on the screen 20 while placing the projector 100 extremely close to the screen 20, it may be necessary to enhance the divergence of the luminous flux incident on the mirror optical system from the lens optical system 8, converge the projection luminous flux 14 after being reflected off the second mirror 10 (concave mirror) provided in the mirror optical system and set a converging position 15 to a position close to the second mirror 10 and distant from the screen 20.

If the converging position 15 is distant from the screen 20 but is not close to the second mirror 10, divergence of the projection luminous flux 14 obtained from the projector 100 set at a position extremely close to the screen 20 will not be sufficient. Accordingly, a large image will not be displayed on the screen 20.

Figure 14:
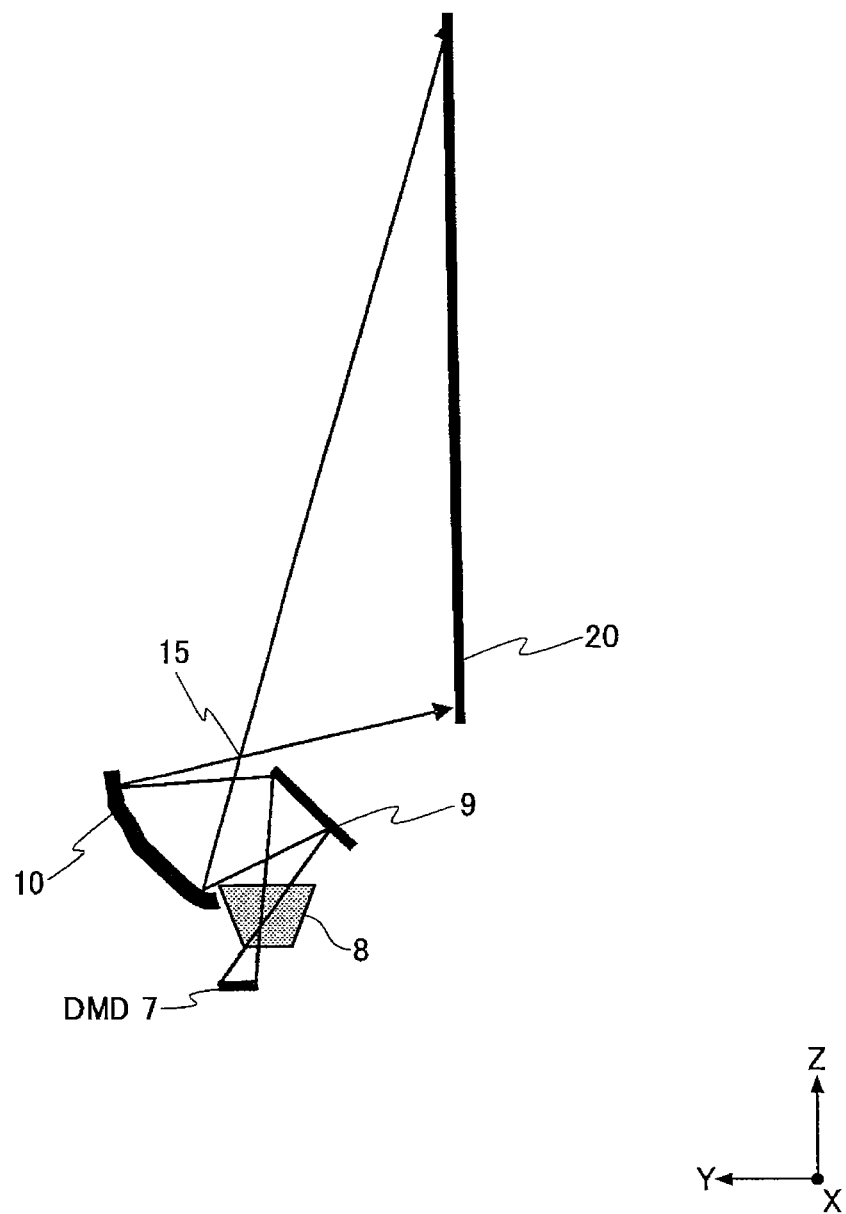
FIG. 14 is a ray diagram illustrating features of light projected by the projection optical system.

For example, as illustrated in FIG. 14, if the converging position 15 is distant from the screen 20 and is close to the second mirror 10, the projection luminous flux 14 from the projector 100 is sufficiently divergent even if the projector 100 is set at a position extremely close to the screen 20. Accordingly, the sufficiently divergent projection luminous flux 14 may be displayed as an enlarged image on an entire surface of the screen 20.

The illustration of the embodiment continues by referring back to FIG. 13. As illustrated in FIG. 13, since the lens optical system 8 is vertically arranged along a direction of gravitational force, the lens closest to the first mirror 9 may preferably have a convex surface. With the convex surface of the lens, dust will not be easily attached to the lens surface and dust attached to the lens surface may spontaneously fall along the lens surface by gravitational force in a downward direction. Further, dust will not intrude inside the lens barrel 81. Hence, among the lenses of the lens optical system 8, a lens surface of a lens closest to the DMD 7 may rarely acquire dust.

In the projector 100 according to the embodiment described above, the converging position 15 is set at a position farther away from the screen 20 and closer to the second mirror 10. Accordingly, even if the projector 100 is placed at a position extremely close to the screen 20, an enlarged image may be displayed on the screen 20. Further, even if the lens optical system 8 is vertically arranged in the projector 100, dust will not be reflected in a projected image.

Seventh Embodiment

Next, a projection optical system provided in an image display apparatus according to a seventh embodiment is described. In the projection optical system illustrated in FIG. 13, if an area of the first mirror 9 is denoted by S1, an area of the second mirror 10 is denoted by S2, S1 and S2 has a relationship represented by S1<S2, which may be represented by a configuration illustrated in FIG. 13. The smaller the proportion of the area of the mirror and the particle size of dust, the lower the adverse effect on the reflection of dust on the screen (e.g., denoted by an "area H") or the amount of light on the screen may be. For example, the adverse effect on the screen may be greater when dust having a particle size of 0.01 mm is attached to the first mirror 9 than when the dust having the same particle size attached to the second mirror 10.

Hence, in order to reduce the adverse effect on the screen such as the dust reflecting on the screen or the reduction in the amount of light on the screen due to the dust reflection without changing the area H of the screen, it is preferable to increase the area S1 of the first mirror 9. However, it may be necessary to increase the angle of view of the lens optical system 8 to increase the area S1 of the first mirror 9. In order to downsize the entire configuration of the projection optical system after having increased the angle of view of the lens optical system 8, it is preferable that a concave lens group be applied to a lens group located close to the first mirror 9 and a convex lens group having positive refractive power be applied to a lens group located close to the DMD 7 among lens groups of the lens optical system 8.

In this case, the divergence of the projection luminous flux 14 is further be increased, and hence, it may be possible that the projection luminous flux 14 that has reflected off the first mirror 9 may strike the lens optical system 8 to be blocked off by the lens optical system 8. Hence, in order to overcome such an outcome, a possible obstacle part of the lens optical system 8 may be eliminated from the optical path of the projection luminous flux 14 reflected off the first mirror 9 and traveling toward the second mirror 10, such that the projection luminous flux 14 will not be blocked off by the lens optical system 8. Thus, an atypical lens may be applied to a lens closest to the first mirror 9 among the lenses constituting the lens optical system 8 such that the lens optical system 8 will not block off the projection luminous flux 14.

Figure 15:
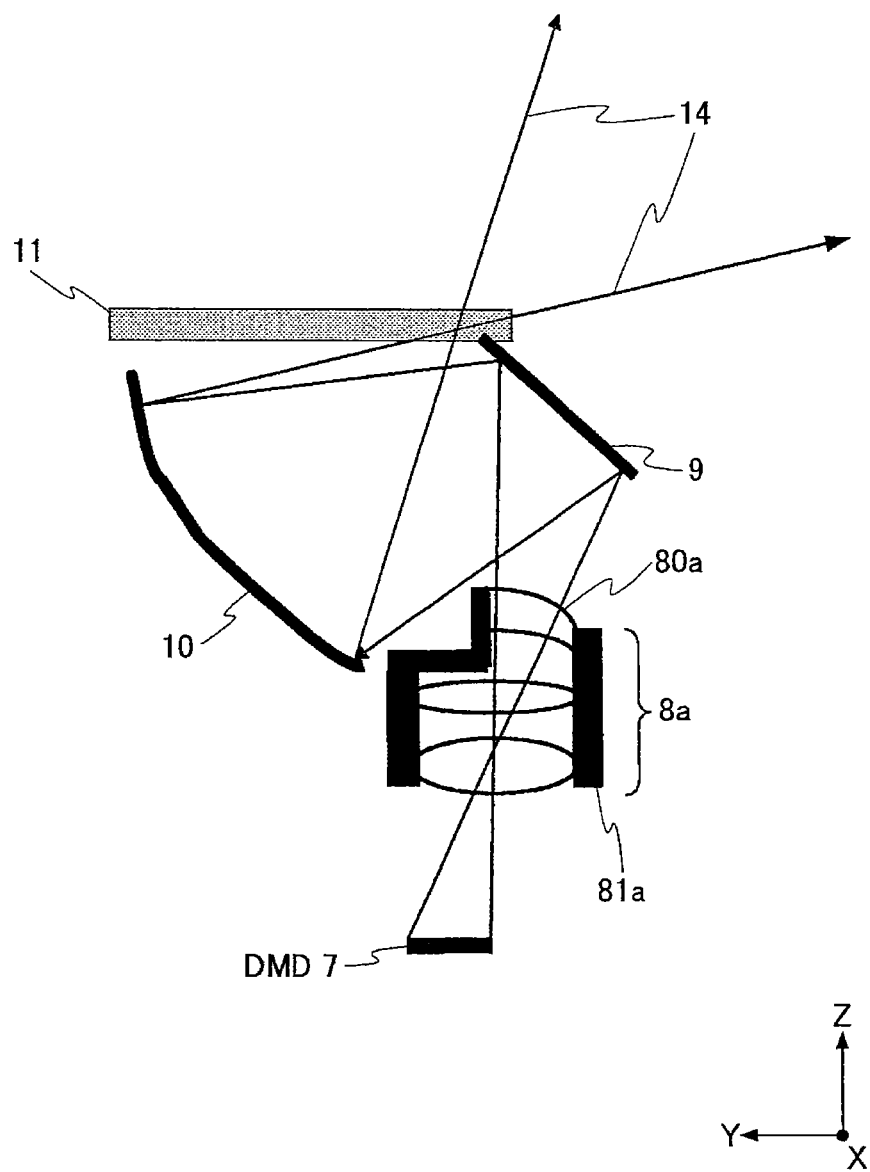
FIG. 15 is a side view illustrating another example of a main part of an projection optical system provided in an image display apparatus according to another embodiment.

FIG. 15 is a side view illustrating an example of a projection optical system provided in an image display apparatus according to the embodiment in which an atypical lens is applied to a lens closest to the first mirror 9. In FIG. 15, the lens optical system 8a includes the atypical lens 80a arranged closest to the first mirror 9 and the lens barrel 81a holding the atypical lens 80a and the like. As illustrated in FIG. 15, among the lenses constituting the lens optical system 8a, approximately a half of the atypical lens 80a arranged closest to the second mirror 9 is cut out and the other half remain unremoved. With this configuration, any part of the lens optical system 8a will not interfere with the optical path of the projection luminous flux 14 reflected off the first mirror 9 and traveling toward the second mirror 14. In addition, even if the projection luminous flux 14 reflected off the first mirror 9 has higher diffusability, the projection luminous flux 14 will not be blocked off by the lens optical system 8a and may be able to reach the second mirror 10.

Accordingly, the optical path allowing the projection luminous flux 14 to pass through may be widened by forming a cutout part in an end part of the lens barrel 81a and the lens 80a closest to the first mirror 9. Hence, the projector 100 may have the projection optical system that is reduced in size and weight and may be capable of projecting an enlarged image on the screen 20 at an extremely close range of the screen 20.

As is clear from rays of light illustrated in FIG. 15, the usable range of the lens 80a is a remaining part opposite to the cutout part of the lens 80a. Accordingly, the definition and the brightness of the image projected on the screen 20 will not be affected.

Note that the lens 80a may be formed of a plastic lens or a mold lens that originally includes a cutout part.

Eighth Embodiment

Figure 16:
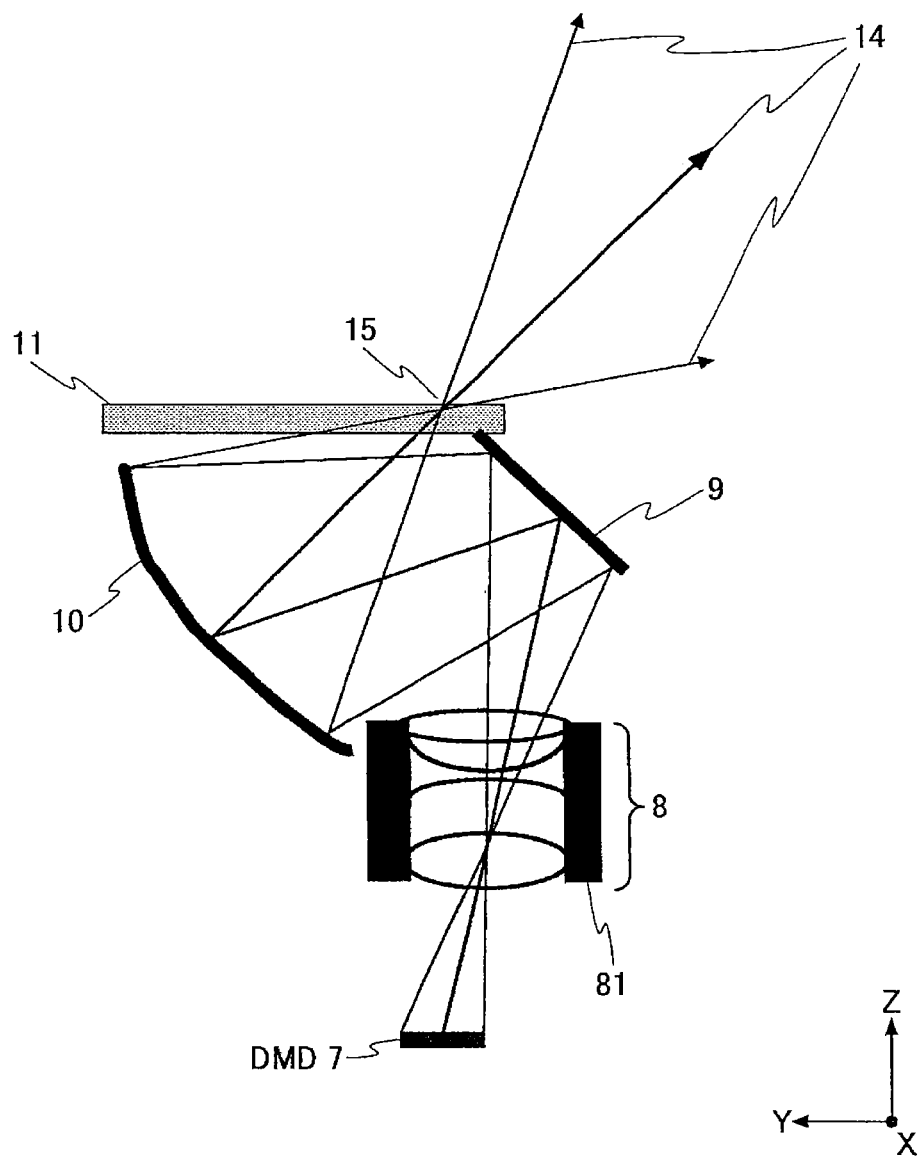
FIG. 16 is a side view illustrating another example of a main part of an projection optical system provided in an image display apparatus according to another embodiment.

Next, a projection optical system provided in an image display apparatus according to an eighth embodiment is described. FIG. 16 is a schematic diagram illustrating an enlarged main part of the projection optical system provided in the image display apparatus according to the eighth embodiment.

The purposes of arranging dustproof glass 11 above the second mirror 10 in the projection optical system provided in the image display apparatus according to the eighth embodiment is to protect the second mirror 10 of the concave mirror and to prevent particles such as dust from intruding into the lens optical system 8. Note that the quality of the projected image will not deteriorate by arranging the dustproof glass 11 in the projection optical system.

It is preferable that the dustproof glass 11 be as small as possible in the projection optical system provided in an image display apparatus according to the eighth embodiment. That is, if the dustproof glass 11 is large, the projection optical system itself is large, which may increase the size of the projector 100.

The projection luminous flux 14 reflected off the second mirror 10 to travel toward the screen 20 (not illustrated) is converged once, and the once converged projection luminous flux 14 is then diffused. In order to achieve the purpose of arranging the dustproof glass 11 in the projection optical system without increasing the size of the dustproof glass 11, the projection optical system may be configured such that the converging position 15 is located close to the dustproof glass 11. As illustrated in FIG. 16, if the converging position 15 of the projection luminous flux 14 is located close to the dustproof glass 11, the size of the dustproof glass 11 may not necessarily be increased. Hence, the projection optical system may be reduced in size. However, if the converging position 15 of the projection luminous flux 14 is located away from the dustproof glass 11, the projection luminous flux 14 diffuses at once. Hence, the size of the dustproof glass 11 may need to be increased.

That is, in the projector 100 according to the embodiment, it is preferable to locate the converging position 15 at a position close to the dustproof glass 11 and the first mirror 9 of the plane mirror in order to satisfy the following three requirements: (1) the projection luminous flux 14 traveling in a direction from the second mirror 10 to the screen 20 will not be blocked off, (2) the size of the entire projection optical system including the lens optical system 8, the first mirror 9 and the second mirror 10 may be reduced, and (3) the size of the dustproof glass 11 may be reduced.

Further, when dust is accumulated in the converging position 15, the amount of light in the screen 20 may be decreased. Accordingly, the dustproof glass 11 may be arranged such that the dustproof glass 11 covers the converging position 15 while the dustproof glass 11 is inclined to the entire projection luminous flux 14. For example, as illustrated in FIG. 16, the dustproof glass 11 may be arranged parallel to a plane of the DMD 7.

Ninth Embodiment

Figure 17:
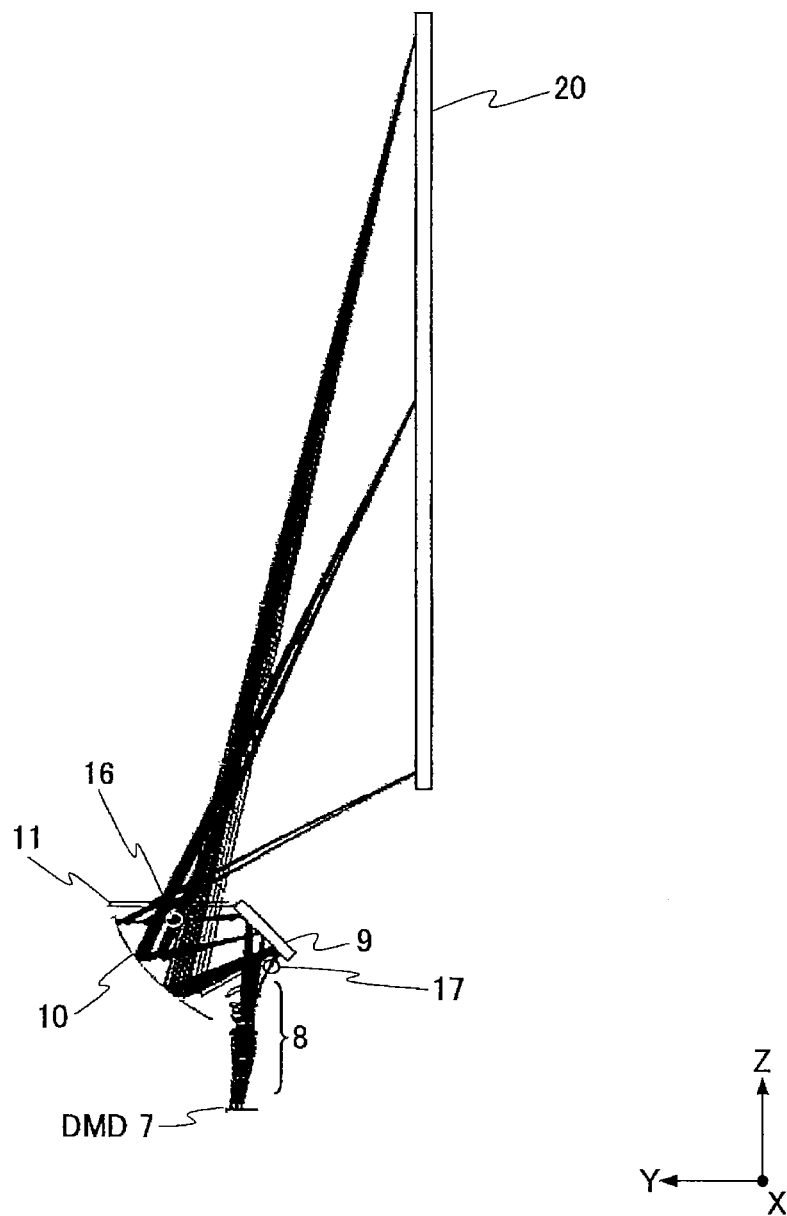
FIG. 17 is a ray diagram illustrating the trajectory of light projected by the projection optical system.

Next, a projection optical system provided in an image display apparatus according to a ninth embodiment is described. FIG. 17 is a ray diagram illustrating trajectory of light projected by the projection optical system. In FIG. 17, seven rays of light are traced from each of fifteen points on the DMD 7 illustrated in FIG. 18. In FIG. 17, reference numerals 16 and 17 each denote an optimal position at which an intermediate image is formed in the optical path of the projector 100 in this embodiment.

FIG. 18 is a plan view of the DMD 7. In FIG. 18, among plural points on a plane of the DMD 7, a point 71 placed at a midpoint in an X-axis direction and at a lower end of the plane of the DMD 7 in a Y-axis direction is eccentrically arranged in the Y-axis direction. The amount of eccentricity is 1.56 mm.

The illustration of the embodiment continues by referring back to FIG. 17. FIG. 17 is a ray diagram illustrating the trajectory of light projected on the screen by the projection optical system utilized in the image display apparatus according to the ninth embodiment. As illustrated in FIG. 17, the projection optical system includes two coupling optical systems including the lens optical system 8 and the second mirror 10 formed of a concave mirror. The lens optical system 8 includes a function to form an image (intermediate image) of the DMD 7. The second mirror 10 serves as a function to form an intermediate image of the DMD 7 on the screen 20.

The projection optical system having the two coupling optical systems exhibits a function to form a "definite" or "sharp" image of the DMD 7 on the screen 20. In this case, the intermediate image of the DMD 7 may be a "blurred" or "fuzzy" image. It may be rather preferable that the intermediate image be a "blurred" image in order to prevent particles of dust from being reflected on the screen 20. That is, if the intermediate image is "definite" or "sharp", the "definite intermediate image" is reflected off the second mirror 10 to form a "definite image" on the screen 20.

If dust is present around the first mirror 9 of a plane mirror on which the intermediate image is formed, an image of the dust is definitely reflected on the screen 20. If, on the other hand, the intermediate image is a "blurred" image, the blurred image reflects off the second mirror 10 to definitely form a "blurred image" on the screen 20. Accordingly, even if dust is attached to the first mirror 9, the image of the dust formed on the screen 20 is the indistinctive "blurred image" of the dust. Hence, it is preferable to form the "blurred image" in the lens optical system 8 so as to definitely form the "blurred intermediate image" reflected off the mirror 10 on the screen 20.

However, it may be difficult to form a "blurred" intermediate image composed of pixels located close to the optical axis. Accordingly, the projection optical system utilized in the image display apparatus according to the ninth embodiment is configured such that the intermediate image composed of pixels located close to the optical axis is not formed on the first mirror of the plane mirror.

In FIG. 17, the reference numeral 16 indicates a position at which an intermediate image composed of pixels located close to the optical axis. Likewise, the reference numeral 17 indicates a position at which an intermediate image composed of pixels located distant (away) from the optical axis. In the DMD 7, an intermediate image composed of pixels located farthest from the optical axis of the lens optical system 8 may spontaneously have increased aberration. Accordingly, since an optical spot diameter becomes larger, dust reflected on the mirror surface may be smaller.

The second mirror 10 of the concave mirror is configured to form an intermediate image formed in the lens optical system 8 on the screen 20. Hence, if dust is present around the position 16, an image of the dust may be formed on the screen 20. Specifically, if dust is present at a position of the definite intermediate image having a small spot diameter, an image of the dust may be definitely reflected on the screen 20. If, on the other hand, dust is present at a position of the definite intermediate image having a large spot diameter, an image of the dust may be reflected as a "blurred" image of the dust so as not to be distinctively reflected on the screen 20. Accordingly, it is preferable to form an intermediate image composed of pixels located away from the optical axis between the lens optical system 8 and the first mirror 9. With such a configuration, it may be possible to obtain an image display apparatus capable of projecting an enlarged image onto the screen 20 by acquiring large curvature of field and minimizing a distance between the screen 20 and the projector 100.

If the intermediate image composed of pixels located close to the optical axis to distant from the optical axis is formed on a reflection plane of the first mirror 9, an intermediate image is formed such that the intermediate image has a large spot diameter on a reflection surface of the second mirror 10 to blur the intermediate image, and that the intermediate image is formed between the first mirror 9 and the second mirror 10. With this configuration, dust attached to the first mirror 9 will not be reflected on the screen 20.

A spot diameter may be adjusted as an optimal size by applying two aspheric lenses to lenses of the lens optical system 8 on the first mirror 9 side. Further, aspheric lenses may be applied to the lenses located near a diaphragm so as to increase a spot diameter of the intermediate image composed of pixels located close to the optical axis while decreasing a spot diameter of an image composed of pixels located close to the optical axis on the projection surface of the screen 20.

Note that a projector having a configuration differing from that of the projector 100 utilized in the above embodiment is considered. The projector is configured such that the projection luminous flux 14 emitted from the DMD 7 is not reflected off the first mirror 9 but the projection luminous flux 14 having passed through the lens optical system 8 strikes the second mirror 10. In the projector having such a configuration, if the projection optical system is arranged on an exterior of the projector, a main body of the projector may collide with the screen 20. Accordingly, the projector having this configuration may not be placed at a close range of the screen 20. By contrast, the projector 100 utilized in the image display apparatus according to the above embodiment is configured such that the projection luminous flux 14 exhibiting high divergence is reflected via the first mirror 9 and the second mirror 10 and projected onto the screen 20. Accordingly, the image display apparatus according to the above embodiment having the projector 100 may be capable of projecting an image on the screen 20 from a position extremely close to the screen 20.

Figure 19:
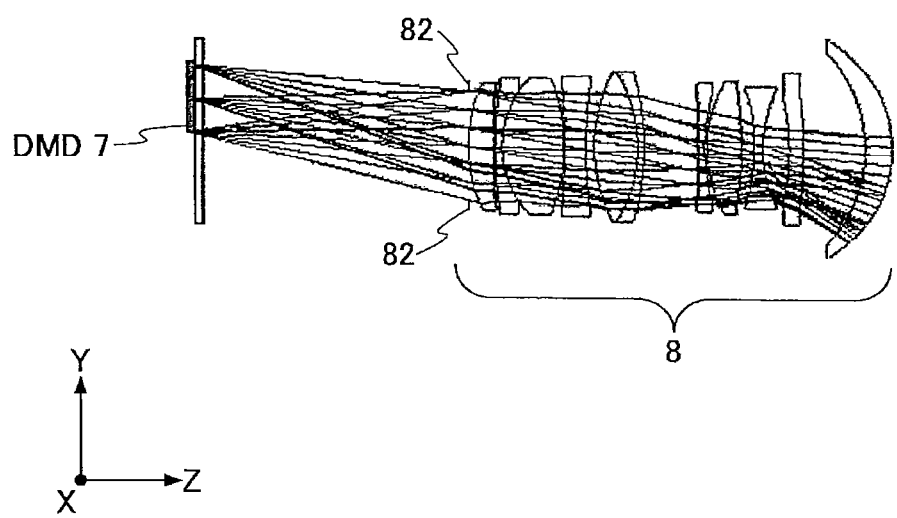
FIG. 19 is a side view illustrating an example of a lens optical system provided in the image display apparatus according to the embodiment.

FIG. 19 illustrates a configuration example of the lens optical system 8. In FIG. 19, the optical axis of the lenses is determined as a Z-axis and two other axis orthogonal to the Z-axis are determined as an X-axis and a Y-axis, respectively. The lens optical system 8 illustrated in FIG. 19 is a coaxial optical system in which the respective optical axes of the lenses are in the same straight lines.

In FIG. 18, among plural points on a plane of the DMD 7 illustrated in FIG. 18, a point 71 on a lower end of the plane of the DMD 7 in the Y-axis direction is eccentrically arranged in the Y-axis direction, and the amount of eccentricity is 1.56 mm. That is, in FIG. 19, the optical axes of the DMD 7 are located 1.56 mm below the lower end of the DMD 7.

As illustrated in FIG. 19, a lens group located closest to the DMD 11 serving as an image display device among plural lens groups constituting the lens optical system 8 includes a diaphragm 82. The amount of luminous flux emitted from the DMD11 and reaching the not-illustrated screen 20 may be determined based on the diaphragm 82. Further, the angle of field may be increased by arranging the diaphragm 82 in the lens group located closest to the DMD11. With such a configuration, the effect of the dust or particles reflecting on the screen may be reduced owing to an increase of the diffusion of the luminous flux at a position of the lens closest to a mirror optical system where dust or particles are most likely to accumulate or an increase of the diffusion of the luminous flux on the reflection plane.

Next, specific numerical examples of the projection optical system are illustrated. FIG. 20 is a table illustrating a configuration of the aforementioned coaxial optical system.

In the table of FIG. 20, planes 4, 5, 21, 22, 23 and 24 are aspherical, and FIG. 21 illustrates aspherical coefficients of the respective planes.

The aspherical planes are computed by the application of the aspherical coefficients illustrated in the table of FIG. 21 based on the following formula (1).

$$D = \frac{C \cdot H^2}{1 + \sqrt{1 - (1+K) \cdot C^2 \cdot H^2}} + \quad (1)$$

$$E_4 \cdot H^4 + E_6 \cdot H^6 + E_8 \cdot H^8 + E_{10} \cdot H^{10} + \ldots$$

FIGS. 22A and 22B are tables illustrating coefficients for forming a reflection plane of the second mirror 10.

The reflection plane of the second mirror 10 is computed by the application of the coefficients illustrated in the tables of FIGS. 22A and 22B based on the following formula (2).

$$z = \frac{cr^2}{1 + SQRT[1 - (1+k)c^2r^2]} + \sum_{j=2}^{72} C_j x^m y^n \quad (2)$$

where $z$ represents a sagittal height of a plane parallel to $z$ axis, $c$ represents a vertex curvature ($CUY$), $k$ represents a conic constant, and $C_j$ represents a coefficient of monomial expression $x^m y^n$ FIG. 23 is a table illustrating a layout of the first mirror 9, the second mirror 10 and the dustproof glass 11.

With the projector 100 having the aforementioned configuration, it may be possible to provide an image display apparatus capable of displaying an enlarged image on the screen by projecting light from a position extremely close to the screen.

Note that "**" in the table of FIGS. 22A and 22B represents exponentiation. Note also that "*" in the table of FIGS. 22A and 22B represents multiplication.

As described above, the image display apparatus according to the embodiments may be capable of displaying an enlarged image on the screen at a close range by adjusting the converting position of the projection luminous flux exhibiting high divergence.

Further, the image display apparatus according to the embodiments may be capable of displaying an enlarged image on the screen at a close range while reducing an adverse effect of dust reflecting on the screen by adjusting the image forming position of the intermediate image.

According to the aforementioned embodiments, it may be possible to provide an image display apparatus capable of projecting light to display an enlarged image on the screen even if the image display apparatus is placed at a position extremely close to the screen.

According to the aforementioned embodiments, it may be possible to provide a small-sized image display apparatus capable of projecting light to display an enlarged image on the screen at a close range while reducing an adverse effect of dust reflecting on the projected image on the screen even if the dust is attached to the lens optical system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2011-202691 filed on Sep. 16, 2011, and Japanese Priority Patent Application No. 2011-223983 filed on Oct. 11, 2011, the entire contents of which are hereby incorporated herein by reference.

What is claimed is:

1. A projection optical system for use in an image display apparatus having an illumination optical system configured to apply light emitted from a light source, and an image display device configured to receive the light applied from the illumination optical system to form a projection image, the projection optical system comprising: a projector lens composed of a plurality of lenses; a first mirror; and a second mirror formed of a concave mirror, the projection optical system being configured to project the projection image formed by the image display device onto a projection surface, wherein a projection luminous flux passing through the projector lens to be incident on the first mirror is a luminous flux exhibiting divergence, wherein the projection luminous flux reflected off the second mirror after having reflected off the first mirror is converged once, and the once converged projection luminous flux is then projected onto the projection surface, and wherein a lens surface of a lens located closest to the first mirror among the lenses of the projector lens is convex; wherein a position at which the projection luminous flux reflected off the second mirror is converged is closer to the first mirror than to the second mirror.

2. The projection optical system as claimed in claim 1, wherein
a position at which the projection luminous flux reflected off the second mirror is converged is close to the first mirror.

3. The projection optical system as claimed in claim 1, wherein
the first mirror is a plane mirror.

4. The projection optical system as claimed in claim 1, wherein
a position at which the projection luminous flux reflected off the second mirror is converged is close to a virtual reflection plane extended from a reflection plane of the first mirror.

5. The image display apparatus comprising:
the projection optical system as claimed in claim 1;
the illumination optical system configured to apply the light emitted from the light source; and
the image display device configured to receive the light applied from the illumination optical system to form the projection image.

6. The image display apparatus as claimed in claim 5, wherein
each of angles formed between rays of light incident on an image projected onto the projection surface at a center in a horizontal direction and a normal line of the projection surface has a same sign.

7. The image display apparatus as claimed in claim 5, further comprising:
a dustproof member between the second mirror and the projection surface, wherein
a position at which the projection luminous flux reflected off the second mirror is converged is close to the dustproof member.

8. The image display apparatus as claimed in claim 5, wherein
an end of the projector lens located closest to the first mirror among the lenses of the projector lens is protruded more toward a first mirror side than a side end of a lens barrel holding the projector lens.

9. The image display apparatus as claimed in claim 5, wherein
the lens located closest to the first mirror among the lenses of the projector lens is an atypical lens partially having a cutout part.

10. The image display apparatus as claimed in claim 5, wherein
the image display device is a reflection image display device that includes a plurality of two-dimensionally arranged micromirrors, and wherein emission of reflected light is switched on or off by changing an angle of each of the micromirrors to be in an ON state or an OFF state.

11. A projection optical system for use in an image display apparatus having an illumination optical system configured to apply light emitted from a light source, and an image display device configured to receive the light applied from the illumination optical system to form a projection image, the projection optical system comprising: a lens optical system composed of a plurality of lens groups; and a mirror optical system composed of a first mirror, and a second mirror formed of a concave mirror, a projection luminous flux passing through the lens optical system is incident on the first mirror, and the projection optical system being configured to project the projection image formed by the image display device onto a projection surface, wherein an intermediate image is formed between the first mirror and the second mirror, the intermediate image being composed of pixels associated with the image display device located closest to an optical axis of the lens optical system, and wherein a lens surface of a lens group located closest to the first mirror among the lens groups of the lens optical system is convex; wherein a position at which the projection luminous flux reflected off the second mirror is converged is closer to the first mirror than to the second mirror.

12. The projection optical system as claimed in claim 11, wherein
a lens group located closest to the image display device among the lens groups of the lens optical system includes an aperture diaphragm.

13. The projection optical system as claimed in claim 12, wherein
a total refracting power from a lens group next to the lens group having the aperture diaphragm to the lens group located closest to the first mirror among the lens groups of the lens optical system is a negative refractive power.

14. The image display apparatus as claimed in claim 12, further comprising:
an aspherical lens located close to the aperture diaphragm.

15. The image display apparatus comprising:
the projection optical system as claimed in claim 11;
the illumination optical system configured to apply the light emitted from the light source; and
the image display device configured to receive the light applied from the illumination optical system to form the projection image.

16. The image display apparatus as claimed in claim 15, further comprising:
a dustproof member between the second mirror and the projection surface, wherein
the dustproof glass is approximately parallel to a plane of the image display device.

17. The image display apparatus as claimed in claim 15, wherein
an intermediate image is formed between the first mirror and the second mirror, the intermediate image being composed of pixels associated with the image display device located farthest from an optical axis of the lens optical system.

18. The image display apparatus as claimed in claim 15, wherein
the second mirror is a free-form surface mirror.

19. The image display apparatus as claimed in claim 15, wherein
the image display device is a reflection image display device that includes a plurality of two-dimensionally arranged micromirrors, and wherein emission of reflected light is switched on or off by changing an angle of each of the micromirrors to be in an ON state or an OFF state.

* * * * *